United States Patent
Hanebutte et al.

(10) Patent No.: US 12,190,086 B1
(45) Date of Patent: Jan. 7, 2025

(54) METHOD AND APPARATUS FOR ML GRAPHS BY A COMPILER

(71) Applicant: Marvell Asia Pte Ltd, Singapore (SG)

(72) Inventors: Ulf Hanebutte, Gig Harbor, WA (US); Chien-Chun Chou, Morgan Hill, CA (US); Senad Durakovic, Palo Alto, CA (US); Pranav Jonnalagadda, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 209 days.

(21) Appl. No.: 17/747,813

(22) Filed: May 18, 2022

Related U.S. Application Data

(63) Continuation-in-part of application No. 17/390,143, filed on Jul. 30, 2021, now Pat. No. 11,467,811.

(60) Provisional application No. 63/214,651, filed on Jun. 24, 2021.

(51) Int. Cl.
- *G06F 9/44* (2018.01)
- *G06F 8/41* (2018.01)
- *G06F 16/901* (2019.01)
- *G06N 20/00* (2019.01)

(52) U.S. Cl.
CPC ............ *G06F 8/47* (2013.01); *G06F 16/9024* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 10,977,018 B1 * | 4/2021 | Hwang | G06F 8/47 |
| 11,797,876 B1 * | 10/2023 | Wang | G06F 8/451 |
| 2020/0285788 A1 * | 9/2020 | Brebner | G06F 9/547 |
| 2022/0101194 A1 * | 3/2022 | Liu | G06F 8/433 |
| 2022/0113972 A1 | 4/2022 | Nakamura | |
| 2022/0197616 A1 * | 6/2022 | Drepper | G06F 8/47 |

* cited by examiner

*Primary Examiner* — Qamrun Nahar

(57) ABSTRACT

A system and method for splitting a machine learning (ML) graph is disclosed. The system includes a compiler configured to receive an ML model. The compiler generates a graph associated with the ML model, wherein the graph is an internal representation of the ML model. The graph is partitioned into a first subgraph and a second subgraph. The first subgraph is associated with an ML hardware, an ML emulator, or a combination thereof, and the second subgraph is associated with a processor different from the ML hardware. A set of low-level instructions associated with the first subgraph is generated. One or more resources in the ML hardware is identified to execute the set of low-level instructions associated with the first subgraph.

20 Claims, 14 Drawing Sheets

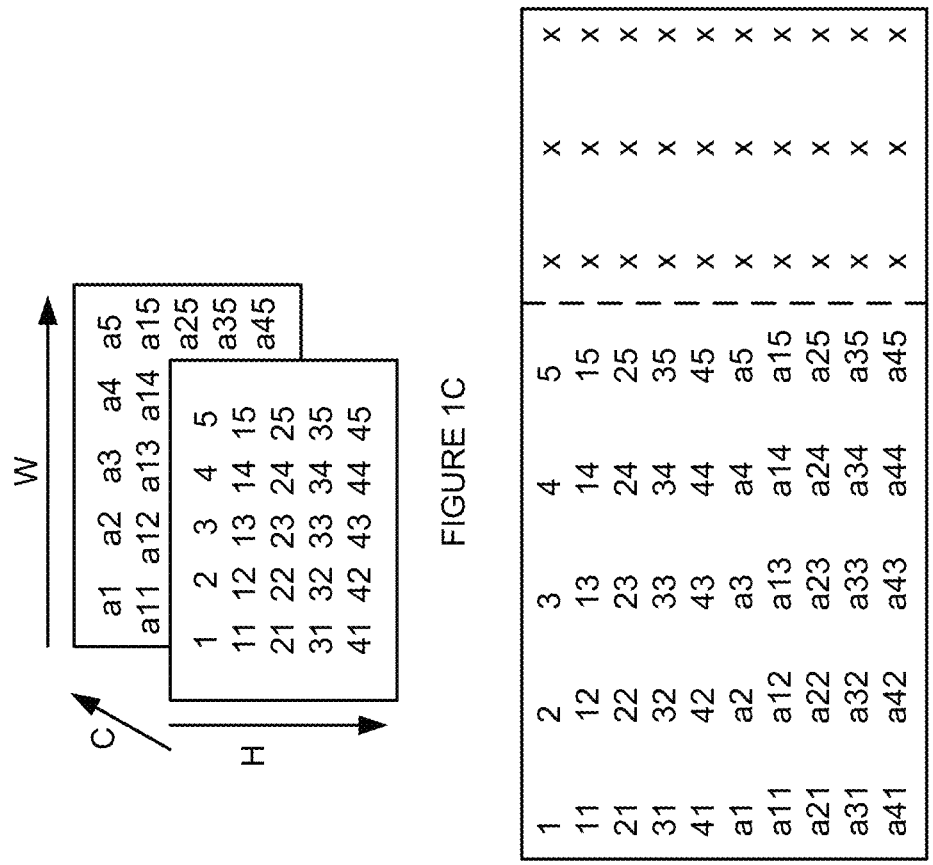
FIGURE 1C
FIGURE 1D
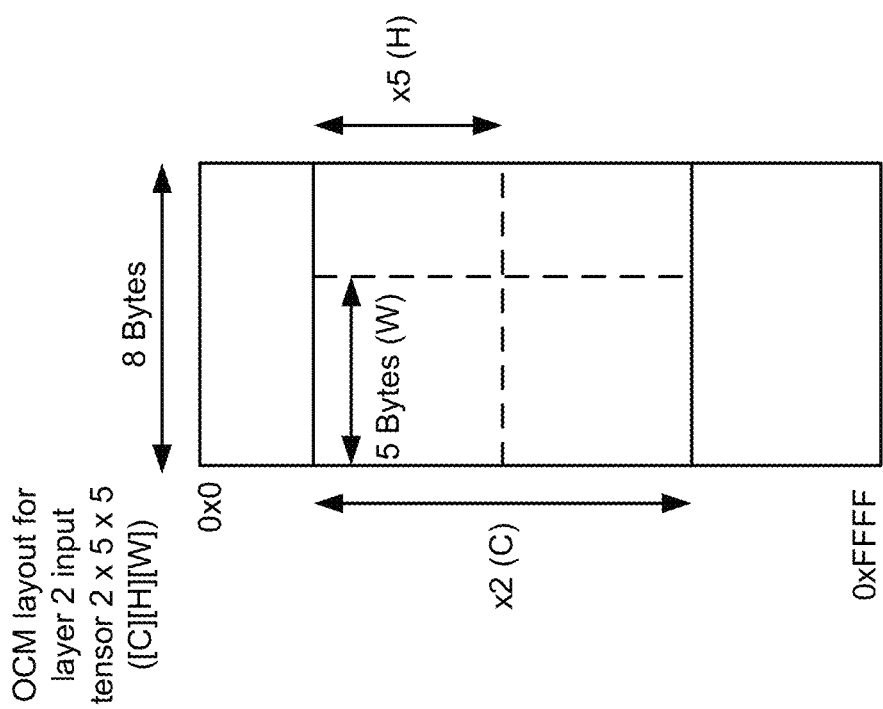
FIGURE 1B

| 1  | a1  | x | x | x | x | x | x |
| 2  | a2  | x | x | x | x | x | x |
| 3  | a3  | x | x | x | x | x | x |
| 4  | a4  | x | x | x | x | x | x |
| 5  | a5  | x | x | x | x | x | x |
| 11 | a11 | x | x | x | x | x | x |
| 12 | a12 | x | x | x | x | x | x |
| 13 | a13 | x | x | x | x | x | x |
| 14 | a14 | x | x | x | x | x | x |
| 15 | a15 | x | x | x | x | x | x |
| 21 | a21 | x | x | x | x | x | x |
| 22 | a22 | x | x | x | x | x | x |
| 23 | a23 | x | x | x | x | x | x |
| 24 | a24 | x | x | x | x | x | x |
| 25 | a25 | x | x | x | x | x | x |
| 31 | a31 | x | x | x | x | x | x |
| 32 | a32 | x | x | x | x | x | x |
| 33 | a33 | x | x | x | x | x | x |
| 34 | a34 | x | x | x | x | x | x |
| 35 | a35 | x | x | x | x | x | x |
| 41 | a41 | x | x | x | x | x | x |
| 42 | a42 | x | x | x | x | x | x |
| 43 | a43 | x | x | x | x | x | x |
| 44 | a44 | x | x | x | x | x | x |
| 45 | a45 | x | x | x | x | x | x |

FIGURE 1G

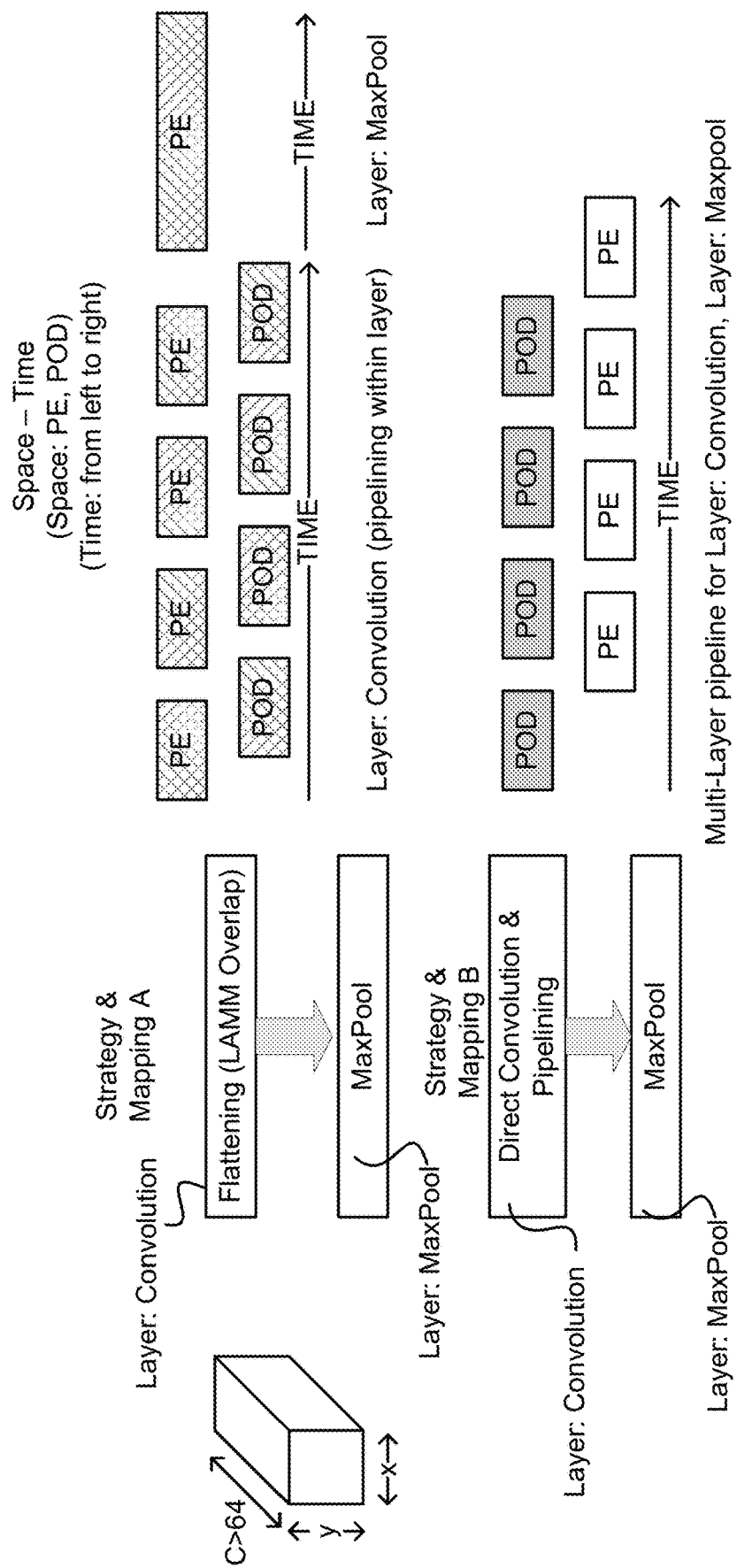

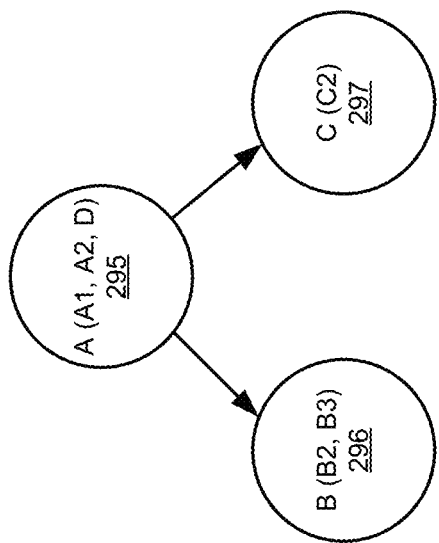
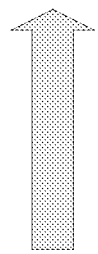
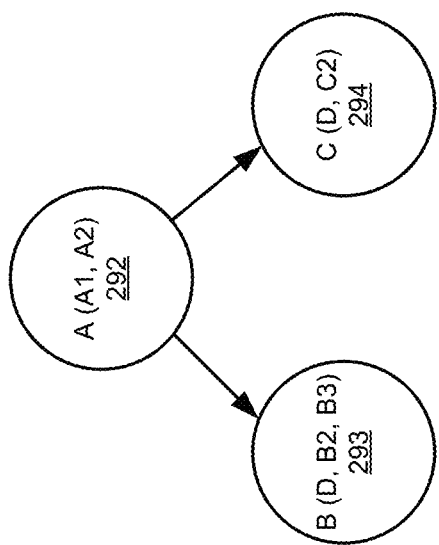
FIGURE 21

METHOD AND APPARATUS FOR ML GRAPHS BY A COMPILER

RELATED APPLICATION

This application is a Continuation-in-Part nonprovisional application that claims the benefit and priority to the U.S. application Ser. No. 17/390,143 filed on Jul. 30, 2021, which claims the benefit and priority to a U.S. Provisional Application No. 63/214,651 that was filed on Jun. 24, 2021, which are incorporated herein by reference in their entirety. The instant application also claims the benefit and priority to the U.S. Provisional Application No. 63/285,733 filed on Dec. 3, 2021, and to the U.S. Provisional Application No. 63/282,600 filed on Nov. 23, 2021, which are incorporated herein by reference in their entirety.

BACKGROUND

Use and implementations of machine learning (ML) and artificial intelligence (AI) methods on electronic devices has become ubiquitous. The design of a hardware architecture of the electronic devices, whether a processor, a programmable logic, a dedicated hardware such as application specific integrated circuit (ASIC), or a dedicated ML hardware, often goes through various optimization and compilation processes.

A compilation process or a compiler generates low-level executable instructions (in binary) from one or more high-level code and identifies hardware resources to execute the low-level executable instructions. The compilation process may include quantization, reduction in mathematical precision, mapping of the application (e.g., a neural network) to a specific number of processing tiles of the hardware. In general, the compiler maps data, e.g., the network tensor weight, the network tensor bias constants, the network tensor input and output for each network layer, etc., to particular memories and generates the executable code associated therewith. For example, the compiler decides on which processing tile and which processing unit (e.g., POD and/or PE) of the tile of a multi-core system will be processing certain data. As another example, the compiler may decide that certain data is to be processed by a central processing unit as opposed to a tile within a ML hardware.

In order to perform an inference run of an ML model on an ML-specific hardware (e.g., a hardware-based ML/AI accelerator) and/or a general-purposed CPU, a binary file (e.g., a set of target specific low-level instructions and/or model-specific data sections) has to be generated. This is typically done in an ahead-of-time (AOT) fashion by a compiler. State of the art ML inference models are often large and complex, containing many different operators. In some embodiments, these models may be represented as (model) graphs containing many nodes (i.e. layers) which are operating on large multi-dimensional tensors.

In order to achieve best performance (i.e. low latency and/or high throughput) an inference may be performed on a group of compute devices, which might be a set of general-purpose CPUs, ML-specific hardware accelerators, or a combination of both. A common compiler approach is to generate code for the CPUs and/or the accelerators by analyzing and processing each individual operator (i.e. layer) of a graph. As such, a tidily-coupled data and control flow with significant overhead may be generated for each layer. Unfortunately, analyzing and processing each individual layer is not only time consuming but also power and process intensive given the complexity and large number of layers. In some conventional systems, a model graph may be partitioned manually to generate two or more operator-based sub-graphs with the control and data flow. Unfortunately, manually determining the data and control flow is not only laborious but also unpractical given the complexity and large number of layers.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1B-1G depict examples of data formats and memory layout according to one aspect of the present embodiments.

FIGS. 2C-2J depict examples of decisions/operations being performed by the compiler to convert a high-level code to a set of low-level instructions according to one aspect of the present embodiments.

DETAILED DESCRIPTION

Figure 1A:
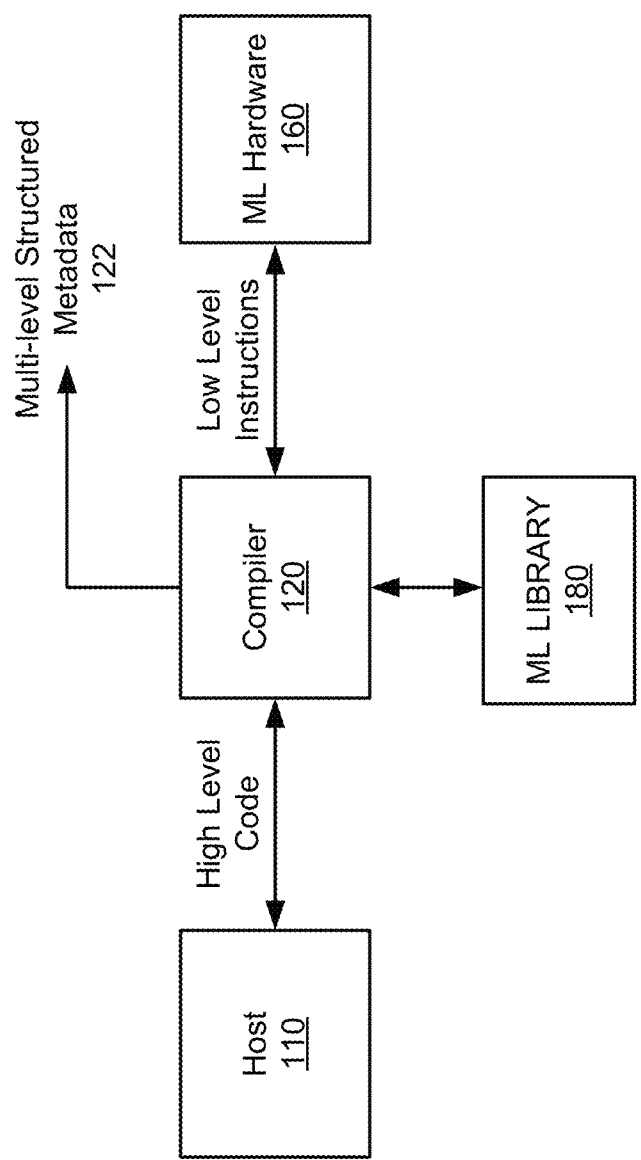
FIG. 1A depicts an example of a diagram of a system to generate a multi-level structured metadata when the high-level code is being compiled into low-level instructions of an application for running on ML hardware according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

In general, a compiler is configured to go through multiple levels or stages during compilation of high-level code into low-level executable instructions on a hardware. At each level (i.e. stage), the compiler needs to make one or more decisions on compilation, e.g., how to map the data to be processed and to which memory blocks, decision on a particular processing tile to execute the executable code for a particular data, etc. It is appreciated that references to level of backend compiler (discussed later in the application) refers to stages of compilation by the backend compiler. At each level, the compiler in addition to generating the low-level executable code may also generate multi-layered structured metadata for that stage that reflects the action(s)/decision(s) being made by the compiler, e.g., mapping of data to memory blocks, precision, quantization, processing tile to perform a particular task/instruction, dimension reordering, copying across processing tiles, etc. It is appreciated that the compiler action(s)/decision(s) occur first in order for the high-level code to be compiled into low-level executable instructions.

It is appreciated that in order to support inference runs, the ML model may be split across multiple devices, e.g., an accelerator (hereinafter ML hardware) and a general processor such as a central processing unit (CPU) or graphics pipeline unit (GPU), etc. In other words, the original model graph may be partitioned into sub-graphs such that certain sub-graphs are executed by an ML hardware and certain sub-graphs are executed by a general processor. The sub-graphs are mapped to specific target hardware. In general, the type of operations within a sub-graph and/or the amount of processing/computation may be used to determine a hardware target selection, e.g., ML hardware as opposed to general processor. Optimized code may then be generated for each sub-graph for its specific target hardware and the control and data flow between multi-operator sub-graphs is determine.

A new approach is proposed for splitting/dividing/partitioning the original model graph into sub-graphs based on the type of operation and/or latency, as nonlimiting examples. In some embodiments, the compiler may recognize operators (i.e., network layers) of the graph and whether the recognized operators are supported by the ML hardware or not. Any operator of the graph that is unsupported by the ML hardware may be partitioned into a sub-graph for execution by a general processor. Additionally, operators of the graph that are supported by the ML hardware may still be partitioned and split into a sub-graph for execution by a general processor to reduce latency, data movement between two sub-graphs, etc. Other operators are formed into a sub-graph for execution by the ML hardware.

In some embodiments, once the sub-graphs are identified by the compiler, the input output node pairs of the sub-graphs are generated, e.g., output of one sub-graph from a general processor to input of one sub-graph of an ML hardware for example. In other words, the generated input/output node pairs to connect the sub-graphs is a representation of the original model graph.

The compiler performs target specific transformations and optimizations on each sub-graph. It is appreciated that because the target associated with each sub-graph may be different, e.g., ML hardware, ML emulator, general processor, etc., their resources and/or architecture are also different, e.g., memory, processing units, etc. As such, each sub-graph may undergo a different transformation and/or optimization depending on the target that will be executing the code generated for the sub-graph.

Partitioning a graph into sub-graphs in an automated fashion and in a more intelligent fashion, as described, based on respective target capabilities and resources improves the processing speed, reduces the required resource, and/or reduces latency. In other words, the original model graph is partitioned based on analysis of optimization/transformation that closely maps to the target hardware, e.g., ML hardware, ML emulator, general processor, etc., thereby enabling detailed computation and communication estimates, which is based on resources such as processing power and data movement, etc. Expressing the original model as sub-graphs, as described, enables the compilation process to be automated such that the model can be executed (i.e., inferred) in a time efficient and resource efficient manner. In some embodiments, a self-tuning capability to perform graph partitioning, compiling, and performing inference run analysis. In yet other embodiments, manual interference by a user may be provide in addition to the automated compilation and partitioning. As such, partitioning the original model graph into sub-graphs, as described, reduces latency by reducing unnecessary memory (or hierarchy) access, reducing unnecessary data movement, etc., in comparison to the conventional system.

It is appreciated that one or more components of the system may run on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes. For non-limiting examples, the compiler may take certain actions and make certain decisions to reduce one or more of data movement, data conversions, storage usage, computation (or duplication of computation), and communication (by duplicating compute if beneficial), etc. The ML hardware may be a dedicated hardware including one or more microprocessors and/or on-chip memory (OCM) units storing the data and/or the set of low-level instructions compiled from the high-level code by the compiler to perform one or more ML operations. At runtime, the ML hardware is configured to retrieve the set of low-level instructions and/or data from the compiler and execute the set of low-level instructions to perform the one or more ML operations according to the set of low-level instructions. For a non-limiting example, the ML-specific hardware can be but is not limited to an inference engine, which is configured to infer and identify a subject via an inference operation from data input according to the ML network model.

In some embodiments, the multi-layered structured metadata may include comments in a generated code that is human readable. It is appreciated that the multi-layered structured metadata may be readable or executable by the compiler or another software in some embodiments. In some embodiments, the multi-layered structured metadata may be stored in one or more files or it may be included as part of the assembly code.

In some ML applications, the multi-layered structured metadata may be generated by the compiler automatically and it may include information such as location of data, e.g., tensor, which is a nested data structure widely used for ML applications, in various memory blocks within the layer. It is appreciated that the multi-layered structured metadata may also provide information regarding the memory location (e.g., host memory, device memory, chip memory, etc.) for each tensor at any given stage in the network execution. Accordingly, expected memory dumps may be generated based on the original tensor that can be used for comparison to memory dumps of the actual hardware, software emulator or hardware emulator runs. As such, the low-level code/instructions can be verified and debugged based on the metadata generated by the compiler.

The multi-layered structured metadata at each layer may also include information regarding certain actions (i.e. decisions) by the compiler, e.g., precision, orientation, split across distributed blocks, quantization, processing tile to perform a certain operation, etc. In some embodiments, the multi-layered structured metadata may describe transformation associated with data being processed, e.g., transformation associated with tensors such as quantization, reducing precision, dimension reordering (e.g., conversion to/from width/height/channel (WHC) from/to channel/height/width (CHW)), splitting or copying across processing tiles, or other compile time optimizations that may result in reduced execution time of the compiled code. It is appreciated that references to tensors are provided for illustrative purposes throughout the application and should not be construed as limiting the scope of the embodiments.

In some embodiments, the multi-layered structured metadata at each layer may be used for optimization purposes, e.g., reducing data movement, reducing storage, reducing duplicate computations, reducing communication by duplicating computing if beneficial, reducing data conversions, etc. In some embodiments, the multi-layered structured metadata generated from one layer may be input into a subsequent layer and it may be relied upon by the compiler itself in order to optimize the compilation and decisions on how to process data and perform operations at the subsequent layer in an optimized fashion, e.g., by reducing data movement, reducing storage, reducing duplicate computations, reducing communications, reducing data conversions, etc.

It is appreciated that the compiler automatically generates the multi-layered structured metadata because the compiler is aware of the system requirements, e.g., channel/height/width as opposed to height/width/channel and number of bytes needs due to alignment needed in hardware. Moreover, the compiler is aware of the hardware architecture, e.g., ML hardware (number of processing tiles, etc.), and as a result automatically generates the multi-layered structured metadata for each layer and decisions that the compiler is making with respect to how to process/map processing and data to the hardware. As such, the multi-layered structured metadata once generated can be used for debugging, verification, or optimization purposes.

Since the overall number of low-level instructions to be executed on the ML hardware remains the same and no additional instructions are introduced because the multi-layered structured metadata is generated as comments that are not executed or stored in one or more files, the instruction flow and the executables of the application are not adversely affected or disturbed for performance profiling purposes. As a result, accurate performance profiling and debugging of the application can be achieved as well as optimization if desired.

Although an instruction set architecture (ISA) is used as a non-limiting example of the low-level instruction format to illustrate the proposed approach in the embodiments described below, it is appreciated that the same or similar approach is equally applicable to other types of low-level instructions. It is also appreciated that an ML hardware (e.g., inference engine) is used as a non-limiting example of the hardware where the low-level instructions are executed to illustrate the proposed approach in the embodiments described below, it is appreciated that the same or similar approach is equally applicable to other types of hardware or hardware simulator to support generating a metadata using a compiler that can ultimately be used for verification, debugging, and optimization purposes. Moreover, it is appreciated that an ML-related operation or function is used as a non-limiting example of the application of the high-level code to illustrate the proposed approach in the embodiments described below, it is appreciated that the same or similar approach is equally applicable to other types of software applications including but not limited to firmware, hardware simulation software, or register transfer level (RTL) simulation software, to support the compiler generating a metadata.

FIG. 1A depicts an example of a diagram of a system to support generating a multi-level structured metadata when the high-level code is being compiled into low-level instructions of an application for running on ML hardware. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1A, the system includes a host 110, a compiler (compiling engine) 120, optionally an ML library 180, and an ML hardware 160. It is appreciated that one or more components of the system may run on one or more computing units or devices (not shown) each with software instructions stored in a storage unit such as a non-volatile memory of the computing unit for practicing one or more processes. When the software instructions are executed, at least a subset of the software instructions is loaded into memory by one of the computing units, which becomes a special purposed one for practicing the processes. The processes may also be at least partially embodied in the computing units into which computer program code is loaded and/or executed, such that, the computing units become special purpose computing units for practicing the processes.

In the example of FIG. 1A, the compiler 120 coupled to a host 110 is configured to accept a high-level code of an application (e.g., an ML operation) from the host 110, wherein the high-level code includes a plurality of high-level functions/operators each called at one or more lines in the high-level code. The compiler 120 is then configured to compile each high-level function/operator in the high-level code into a set of low-level instructions to be executed on the ML hardware 160, wherein each set of the low-level instructions is uniquely identified and associated with the high-level function. It is appreciated that the ML hardware 160 is provided for illustrative purposes and should not be construed as limiting the scope of the embodiments. For example, any type of hardware based system configured to execute low-level instructions may be used.

Here, the high-level code is a software code written through a commonly-used high-level programming language. For a non-limiting example, the high-level functions of the application or ML operation can be a dense and/or regular operation, e.g., a matrix operation such as multiplication, matrix manipulation, tanh, sigmoid, etc. For another non-limiting example, the high-level functions of the application or ML operation can be a sparse or irregular operation, e.g., memory transpose, addition operation, operations on irregular data structures (such as trees, graphs, and priority queues), etc. In some embodiments, the high-level code of the application may include one or more library function calls to an ML library 180. For a non-limiting example, the compiler 120 may call a library function to perform a matrix-matrix-multiplication of two matrices of given sizes and the ML library 180 returns the set of low-level instructions that are needed to perform this library function, wherein the set of low-level instructions includes one or more of loading data from a memory (e.g., OCM) into registers, executing dot-product, and storing the data back into the memory.

In some embodiments, the set of low-level instructions are in the format of ISA designed for efficient data processing covering, for non-limiting examples, one or more of different addressing modes, native data types, registers, memory architectures, and interrupts. In some embodiments, the ISA is a predominantly asynchronous instruction set, wherein each instruction in the ISA format programs a state-machine, which then runs asynchronously with respect to other state machines. It is appreciated that a series of instructions in the ISA format do not necessarily imply sequential execution. In some embodiments, the ISA provides separate synchronizing instructions to ensure order between instructions where needed. In some embodiments, when being executed on the ML hardware 160, the set of low-level instructions in the ISA format program the ML hardware 160 by one or more of: (i) programming one or more input data streams to the ML hardware 160; (ii) programming one or more operations to be performed on the input data streams; and (iii) programming one or more output data streams from the ML hardware 160.

In some embodiments, the compiler 120 is configured to generate additional information to further correlate the high-level function to one or more layers of a neural network used for machine learning applications. For non-limiting examples, the neural network can be but is not limited to one of a convolution neural network (CNN), a recurrent neural network (RNN), a gradient boosting machine (GBM), and a generative adversarial neural network. For non-limiting examples, the additional information includes but is not limited to which tasks of the high-level function belong to a specific neural network layer as well as which neural network layer the high-level function belongs to.

Figure 3:
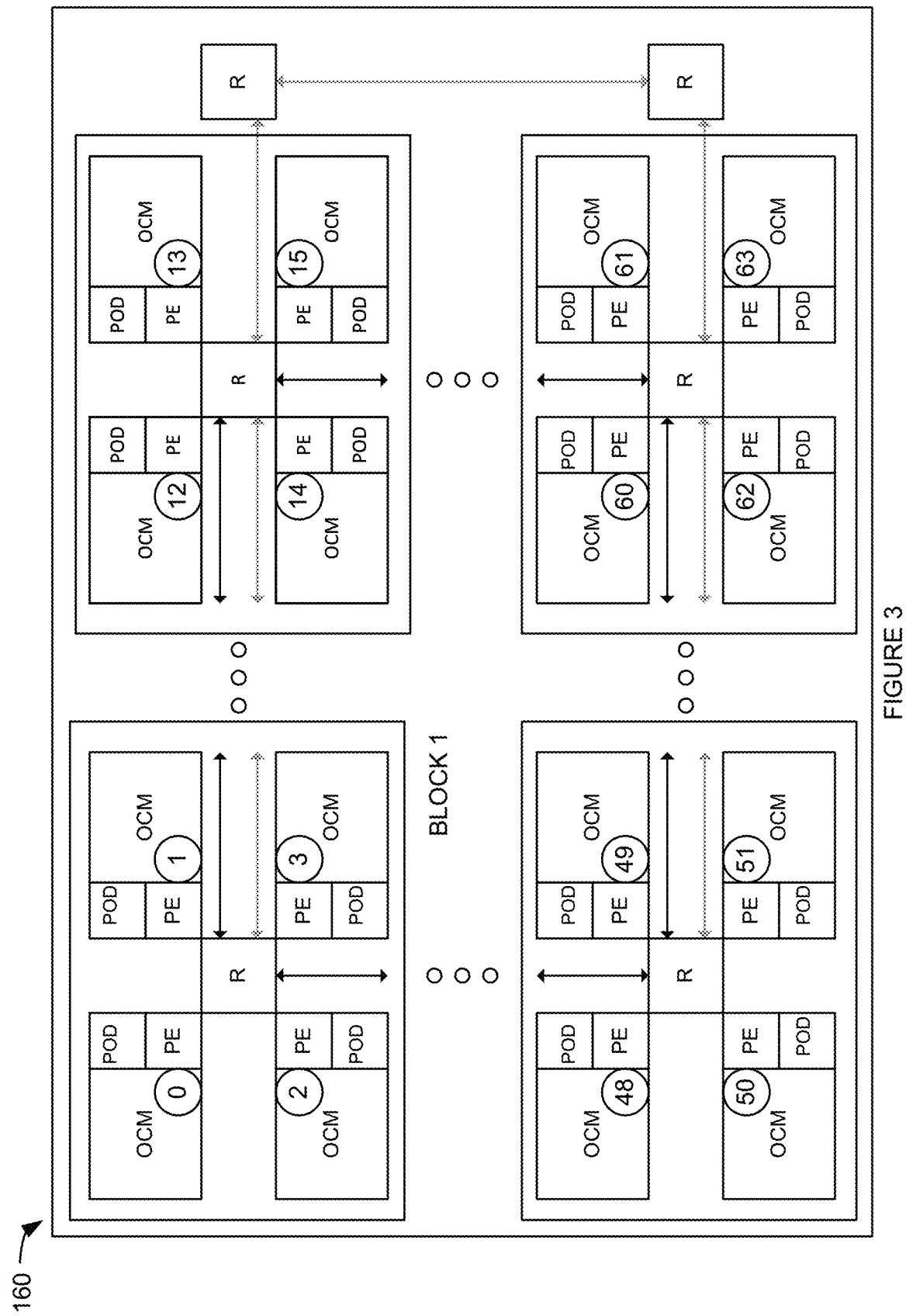
FIG. 3 depicts an example of an inference engine that includes a plurality of processing tiles arranged in a two-dimensional array of a plurality of rows and columns according to one aspect of the present embodiments.

Once the set of low-level instructions has been compiled from each high-level function, the compiler 120 is configured to stream the set of low-level instructions as well as data received from the host for the application to the ML hardware 160 for execution. In the example of FIG. 1A, the ML hardware 160 is a dedicated hardware block/component including one or more microprocessors and/or OCM units storing the data and/or the set of low-level instructions compiled from the high-level code performing one or more ML operations. For a non-limiting example, the ML hardware 160 can be but is not limited to an inference engine, which is configured to infer and identify a subject for the application via inference from trained data. At runtime, the ML hardware 160 is configured to retrieve the set of low-level instructions and/or data received from the compiler 120 and execute the set of low-level instructions to perform the high-level application/ML operation according to the set of low-level instructions. FIG. 3 depicts a non-limiting example of an inference engine 160 that includes a plurality of processing tiles, e.g., tiles 0, . . . , 63, arranged in a two-dimensional array of a plurality of rows and columns, e.g., 8 row by 8 columns. Each processing tile (e.g., tile 0) includes at least one OCM, a first type of processing unit (POD), and a second type of processing unit (PE). Both types of processing units can execute and be programmed by some of the plurality of low-level instructions received from the compiler 120. In some embodiments, a plurality of processing tiles forms a processing block, e.g., tiles 0-3 forms processing block 1 and the processing tiles within each processing block are coupled to one another via a routing element, e.g., tiles 0-3 are coupled to one another via routing element R to form processing block 1.

In order to generate the low-level instructions from high-level functions/code, the compiler 120 having knowledge of the ML hardware 160 architecture and software/system requirements makes certain decisions and performs certain operations in order to generate low-level instructions that are as efficient and as optimized as possible (e.g., from hardware perspective and/or software perspective). For example, the compiler 120 may take certain actions and make certain decisions to reduce data movement, to reduce data conversions, to reduce storage usage, to reduce computation (or duplication of computation), to reduce communication (by duplicating compute if beneficial), etc. A nonlimiting and non-exhaustive list of decisions being made by the compiler 120 in addition to the above includes but is not limited to:

- identifying and associating certain sub-graphs of a layer to be processed by ML hardware 160 but other sub-graphs to other processing components (e.g., a central processing unit, GPU, ASIC, etc.),
- fusing operators into composite to map to hardware ISA task (i.e. maps optimally to hardware architecture capabilities),
- splitting input/output tensors of an operation into N parts where N may be the maximum number of tiles or smaller and distributing the parts across the N tiles. The parts may be of unequal sizes and the split input/output may duplicate the associated weights and bias tensors across all N tiles,
- splitting weights/bias (similar to splitting input/output but applied to weights/bias),
- SAMM/LAMM (different mappings of two matrices onto the POD registers based on the shape of the matrices and where SAMM indicates one dimension of the input being short whereas LAMM indicates one dimension of the input being long),
- direct convolution (i.e. performing a convolution by directly applying the kernel to the input tensor in contrast to converting a convolution into a matrix-matrix-multiply that is executed after the input tensor is transformed by the flattening stage which results in an increased data movement and data duplication),
- serializing in time (i.e. mapping an operation into a sequence of steps that are executed sequentially in time),
- number of tiles to use for certain processing/tasks,
- dividing tensors and duplicating on tiles (i.e. manner by which to map data to local tiles either distribute or copy or both, where a set of tiles may be grouped together and within the group the data may be split after the original data is duplicated or copied to each group),
- number of halo cells (i.e. also referred to as ghost cells or rows that are added to distribute data on a tile which contains copies of rows or cells belonging to its neighboring tiles) that allows calculations on a tile be done locally without requiring data to be obtained from neighboring tiles even though it may need the halo cells/rows to be filled via communication prior to executing the calculations, data movement, rebalancing processing on different tiles, memory hierarchy mapping, determining tensor life-cycle (i.e. the amount of time that the tensor data is required to be in memory (mapped to local OCM) to ensure that the last task/instruction that needs to have access to the tensor data has access to the tensor data) in order to perform memory management and to free up unused memory, quantization scaling values (i.e. the output of a certain layer in a quantized network may be rescaled to stay within a particular data range), quantization data types (e.g., signed versus unsigned such as int8 and uint8), rescaling, determining which primitive to use for a given operator (e.g., direct convolution as opposed to flattening plus compute pipeline, complete fully connected (FC) layer (i.e. a matrix-matrix-multiply that might be performed as as one distributed matrix-matrix-multiply (performed as single computation block followed by a single communication block) as opposed to being broken up into a pipeline sequence distributed matrix-matrix-multiplies which allows overlapping of communication and computation), input to pipeline decisions (i.e. decision whether to apply a pipeline strategy, e.g., based on matrix sizes the optimal strategy may not be pipelined), overlapping different hardware components, e.g., processing elements, direct memory access (DMA), etc., on ML hardware 160 to increase parallelism, optimizing use of synchronization primitives exposing and utilizing the ML hardware 160 capabilities for diverse set of workloads, e.g., ML workloads, memory layout and conversion, as described in more detail in FIG. 1B, (e.g., in channel/height/width or height/width/channel format, etc.).

In some embodiments, the compiler 120 in addition to generating low-level instructions is also configured to generate multi-level structured metadata 122 that can be used to debug the code, to verify the code, and/or to optimize the code and compilation. The metadata 122 encapsulates the decisions (as described above) that have been made by the compiler 120 in order to generate the low-level instructions from the high-level code.

Referring now to FIG. 1B, memory layout for channel, height, and width (CHW) according to some embodiments is shown. In this nonlimiting example, for a quantized int8 network, each element of the weight matrix is an int8 value that is represented by 1 byte, however, in an fp16 network, 2 bytes per weight elements may be needed, as 2 bytes are needed to represent an fp16 value. In this nonlimiting example, the input of the OCM layout for layer 2 tensor is in CHW format. According to this nonlimiting example, there are 2 channels and the height and width are 5 bytes each. Accordingly, there are 2 blocks of 5×5 data. In this example, the system may require 8 bytes internally for alignment needed by the hardware. Accordingly, the memory layout needed is 5×5 bytes for one channel and another 5×5 bytes for the second channel, as illustrated in FIG. 1C. In the nonlimiting example of FIG. 1C, unique names are given for each tensor element (i.e. 1, 2, 11, a1, a11) that is different from the hex values such as a45 to be 2626 in decimal, a number much larger than the range of int8 (i.e. −128 to 127), the weight data (2 dimensional matrices that is looked at as a single 3 dimensional tensor where the first is representing channel=1 and the second is representing channel=2) may be a matrix $$\begin{bmatrix} 1 & 2 & 3 & 4 & 5 \\ 11 & 12 & 13 & 14 & 15 \\ 21 & 22 & 23 & 24 & 25 \\ 31 & 32 & 33 & 34 & 35 \\ 41 & 42 & 43 & 44 & 45 \end{bmatrix}$$

while the bias data (channel=2 data of the weight tensor) may be a matrix $$\begin{bmatrix} \alpha 1 & \alpha 2 & \alpha 3 & \alpha 4 & \alpha 5 \\ \alpha 11 & \alpha 12 & \alpha 13 & \alpha 14 & \alpha 15 \\ \alpha 21 & \alpha 22 & \alpha 23 & \alpha 24 & \alpha 25 \\ \alpha 31 & \alpha 32 & \alpha 33 & \alpha 34 & \alpha 35 \\ \alpha 41 & \alpha 42 & \alpha 43 & \alpha 44 & \alpha 45 \end{bmatrix}$$

The memory layout when stored is illustrated in FIG. 1D. As illustrated in FIG. 1D, in this nonlimiting example, the system requires 8 bytes internally and since the data is 5 bytes the remainder 3 bytes are illustrated as "x" and used by the system for internal alignment.

Figures 1E, 1F:
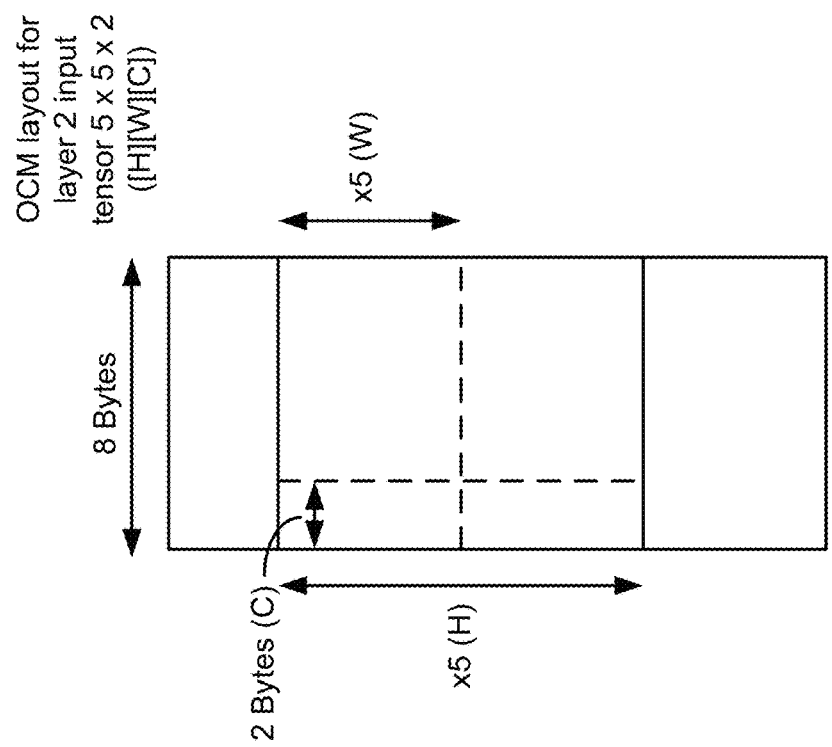

It is appreciated that, in some embodiments, the compiler 120 has knowledge of the architecture of the ML hardware 160 and its requirements, e.g., determining that conversion to HWC format is needed. Referring now to FIG. 1E, the memory layout reflecting the conversion from CHW to HWC format is shown. In this example, since the height is 5 then it is determined that there are 5 blocks of 5×2 since the width is 5 bytes and the channel is 2. FIG. 1F illustrates the blocks of data for the example shown in FIGS. 1B-1D. FIG. 1G illustrates the data once it is stored in the OCM in HWC format according to some embodiments. Here similar to FIG. 1D, since the system requires 8 internal bytes for alignment, the first two bytes are the data and the remainder 6 bytes for each row is illustrated as "x" and used for internal alignment.

It is appreciated that the conversion and the information regarding the memory layout for example is encapsulated within the multi-level structured metadata 122 being generated by the compiler 120. It is similarly appreciated that other decisions or operations performed by the compiler 120 is captured within the multi-level structured metadata 122 that can be used to optimize the operation of the compiler, debug the code, and/or verify the code.

Figure 2A:
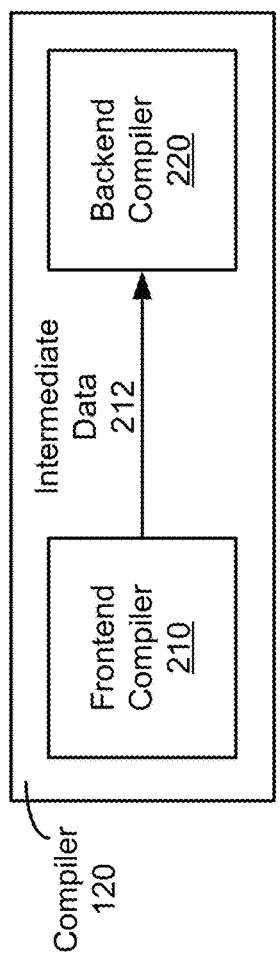
FIGS. 2A-2B depict an example of the set of low-level instructions compiled from a high-level code for an operation using a compiler according to one aspect of the present embodiments.

Referring now to FIG. 2A, a compiler 120 according to some embodiments is shown. In this nonlimiting example, the compiler 120 may include a frontend compiler 210 and a backend compiler 220. It is appreciated that the frontend compiler 210 designation and the backend compiler 220 designation is for illustration purposes only and should not be construed as limiting the scope of the embodiments. For example, a single compiler may be used. The frontend compiler 210 may perform the analysis phase of the compilation by reading the source code, dividing the code into core parts and checking for lexical, grammar, and syntax. In some embodiments, the frontend compiler 210 may include lexical analysis, syntax analysis, a semantic analysis, etc., and generates an intermediate data 212 (also known as intermediate representation). The intermediate data 212 is input into the backend compiler 220 in order to perform specific optimization and to generate the low-level instructions. It is appreciated that for ML compilers, the frontend compiler 210 may include transformation from representation in one ML-framework (such as Keras) into another representation (such as ONNX standard).

Figure 2B:
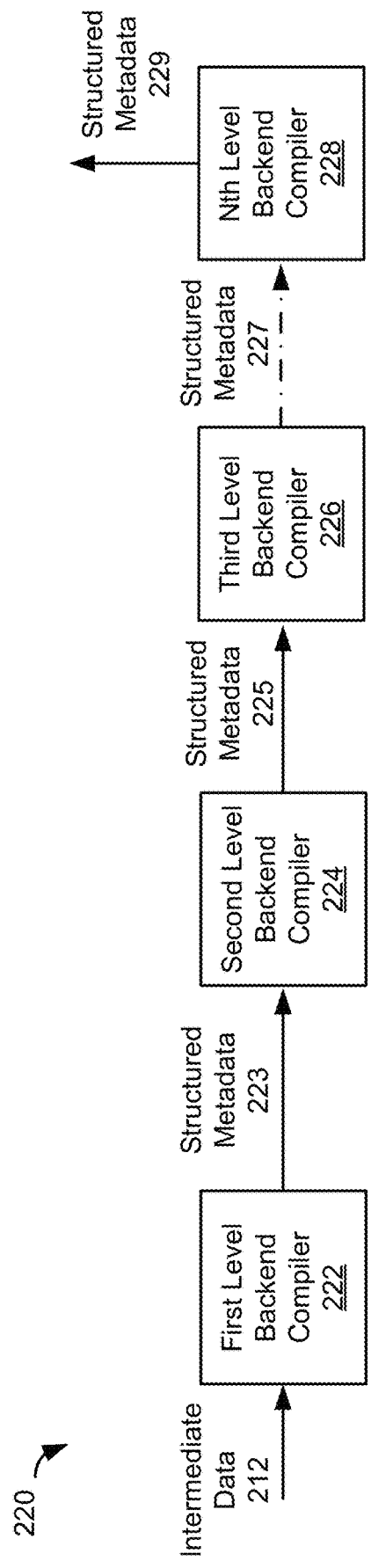

It is appreciated that the backend compiler 220 may include multiple levels according to some embodiments. For example, the backend compiler 220 may include a first level backend compiler 222, a second level backend compiler 224, a third level backend compiler 226, and Nth level backend compiler 228, as illustrated in FIG. 2B. It is appreciated that any number of levels for the backend compiler may be used and that the number of levels shown is for illustrative purposes and should not be construed as limiting the scope of the embodiments. It is appreciated that the output from each level backend compiler is input to its subsequent level backend compiler. It is also appreciated that one or more of the level backend compilers may receive additional data from a source other than other level backend compilers.

It is appreciated that at each level backend compiler one or more structure metadata is generated in addition to the specific tasks/operations being performed by the backend compiler. For example, the first level backend compiler 222 receives the intermediate data 212 and performs transformation/optimization, e.g., target specific fusing/composition, specific data/weigh/output layout format adjustment (an example of the data/weight/output layout format adjustment is illustrated in FIGS. 1B-1G), target specific drop no operations, auto-layer identification in a subgraph (discussed in more detail with respect to the second level backend compiler 224 and in FIG. 2C). It is appreciated that the first level backend compiler 222 also generates a structured metadata 223 that provides information regarding the operations/decisions performed/made by the first level backend compiler 222. It is appreciated that the output of the first level backend compiler 222 is input to the second level backend compiler 224.

Figure 2C:
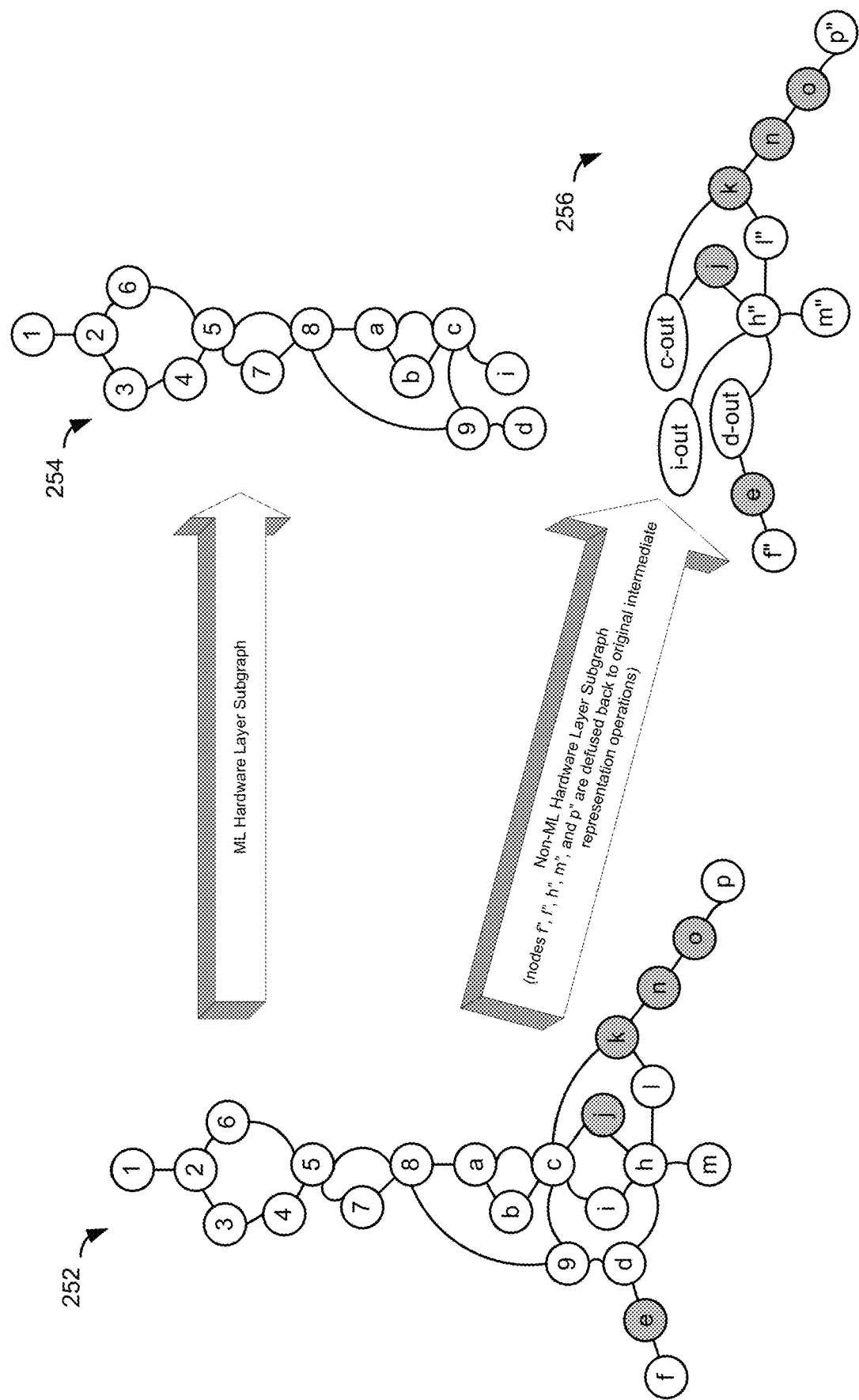

In some embodiments, the second level backend compiler 224 in some nonlimiting examples performs a specific multi-layer based optimization (as an example and described in greater detail in FIG. 2C). It is appreciated that in some embodiments the second level backend compiler 224 may receive data from a source other than other backend compilers. For example, the second level backend compiler 224 may also receive the target configuration for code generation in addition to receiving the output from the first level backend compiler 222. It is appreciated that the target configuration received during inference part of the ML operation can be used to determine the number of tiles to use, OCM base address and size, determining whether to pin all memory usages in OCM or not, determining whether to use special starting memory addresses, user received input on the strategy, determining whether to use int8 of fp16 or pre-quantized flow, etc. An example of the target configuration is provided below for illustration purposes and should not be construed as limiting the scope of the embodiments. It is appreciated that the target configuration describes both the hardware architecture specifics, e.g., arch type (M1K in this example), memory size (0x100000), etc., as well as specific compilation instructions, e.g., number of tiles to use such as 26 and the type of quantized network such as int8.

max_layer=100000
    quantize=int8
    arch=m1k
    inp_quantized_to=uint8
    out_dequantized_from=uint8
    dram_addr_relocatable=1
    ocm_base=0x0
    ocm_size=0x100000
    num_tiles=26
    b=1
    future-be
    wb_pin_ocm=0
    dump_wb
    new_metadata
    ext_strategy_file=<name>

In some nonlimiting examples, the computation and data are moved by the compiler 120 from inference time to compiler time once in compilation in order to reduce computations and data movements at inference runtime. It is appreciated that the second level backend compiler 224 may use a model, e.g., roofline model, given the target hardware configuration (i.e. ML hardware 160) and data layouts, at compilation time to estimate specific runtime performance. It is appreciated that the second level backend compiler 224 similar to the first level backend compiler 222 also generates a structured metadata 225. The structured metadata 225 provides information regarding the operations/decisions performed/made by the second level backend compiler 224. It is appreciated that the output of the second level backend compiler 224 is input to the third level backend compiler 226.

In some embodiments, the third level backend compiler 226 may transform the layer subgraph from the structured metadata 225 to primitive subgraph where each of the primitives may describe a certain algorithmic procedures. In some embodiments, the primitives may perform only computational tasks, only communication tasks between tiles or between tiles and double data rate (DDR), only synchronization tasks, or any combination thereof. For example, the matrix-matrix-multiply primitives LAMM and SAMM are two different computational primitives that are optimized for different matrix shapes. While "all to all" is a communication primitive, as are halo, rebalance and forward gather which are primitives that perform data movements on distributed tensor data. An example of a combined communication and computation primitive is the flattening overlap. Examples of other algorithmic procedures may include MAXPOOL, direct convolution, padding, scratch, etc. The third level backend compiler 226 determines mapping, resource allocation, and parallelism that may be applied on a layer by layer case. For example, the third level backend compiler 226 may determine whether to split input/output on tiles, split weight/bias on tiles, combination of split input/output and weight/bias and serialization on tiles, overlap primitives on tiles, use LAMM as opposed to SAMM1/SAMM2 (described in FIG. 2D) based on the manner in which the register files are used, apply direct convolution or flatten math multiplication (flattening followed by matrix-matrix multiply) or flattening matrix-matrix-multiply overlap based on layer configurations and layer format (described in FIG. 2E). In some nonlimiting examples, the third level backend compiler 226 may also determine the number of tiles to use for a layer and the way to split data tensors and their computations among the tiles for that layer. The third level backend compiler 226 may also determine whether to glue or rebalance and halo tensors or partial tensors and if so the manner of which to do so between different tiles of previous layer and tiles of the next layer. In some nonlimiting examples, the third level backend compiler 226 may determine the manner by which to sync the rebalance tasks among the tiles, e.g., by applying local sync within a tile, global sync among tiles, barrier for all tiles, sync up between specific producer to specific consumer, etc. As synchronization steps are generally costly operations, different levels of synchronizations are supported by hardware that are often inserted judiciously by the compiler. For example, the PE and POD within a tile can be synchronized using a "local sync", which is very light weight as opposed to a global sync among a group of tiles or all tiles that is much more costly. Additionally, synchronization primitives are provided that are optimized as they are limited to specific consumer/producer tiles of a given communication pattern. It is appreciated that in some embodiments, the third level backend compiler 226 may determine the manner of which to reserve DDR and/or OCM memory regions for full or partial tensors to avoid read write data hazards (i.e. data corruption due to unintentional address reuse for optimization that has reused addresses), manner by which perform serialization, and manner by which to reduce data movement, etc. It is also appreciated that in some embodiments, the third level backend compiler 226 may determine the manner of which to reserve DDR and/or OCM memory regions for full or partial tensors, to perform serialization and to reduce data movement. In some nonlimiting examples, the third level backend compiler 226 may pipeline ISA tasks running on the same tile but different processing elements (i.e. PE versus POD) or on different tiles as determined from space-time analysis based on data allocations. Moreover, the third level backend compiler 226 may generate primitive graphs for representing initial job, per-inference runtime job, and per-inference finishing job based on performance needs. Additionally, the third level backend compiler 226 may use a primitive roofline model (e.g., given target hardware configuration (i.e., ML hardware 160)) at compilation time to estimate the ML hardware 160 specific runtime performance and once the final runtime performance statistics are collected the primitives may be calibrated and optimized.

It is appreciated that in some embodiments the third level backend compiler 226 may receive data from a source other than other backend compilers. For example, the third level backend compiler 226 may also receive a strategy indicated by a user (i.e. user strategy) in addition to receiving the output from the second level backend compiler 224, as illustrated below. It is appreciated that the strategy may be an external strategy generated by an analysis/profiling tool which is run external to the compiler flow. It is appreciated that in the following strategy, information for each layer of the fused graph is give. Details such as the type of operation, e.g., convolution or maxpool, the corresponding first and last ONNX operator of the original ONNX graph, the selected strategy and the externally provided strategy hints are given. For the first layer, in this example, the strategy of splitting the input and output among the tiles is applied while the weights and bias tensors are being duplicated. For this example, the hints are matching the applied strategy, but it does not need to be.

{"file_type": "ExtStrategy",
 "layers": [
  {"id": 1, "op": "CONV", "to_layer_ids": [2], "first_onnx_op": "resnetv17_conv0_fwd_transpose", "last_onnx_op": "resnetv17_relu0_fwd__1", "strategy_applied": ["split_io", "dupl_wb"], "external_strategy_hints": ["split_io", "dupl_wb"]},
  {"id": 2, "op": "MAXPOOL", "to_layer_ids": [3, 4], "first_onnx_op": "resnetv17_pool0_fwd__1", "last_onnx_op": "resnetv17 pool0_fwd__1", "strategy_applied": ["split_io"], "external_strategy_hints": ["split_io"]},
  {"id": 3, "op": "CONV", "to_layer_ids": [7], "first_onnx_op": "resnetv17_stage1_conv3_fwd", "last_onnx_op": "resnetv17_stage1_batchnorm3_fwd__1", "strategy_applied": ["split_io", "dupl_wb"], "external_strategy_hints": ["split_io", "dupl_wb"]},
  {"id": 4, "op": "CONV", "to_layer_ids": [5], "first_onnx_op": "resnetv17_stage1_conv0_fwd", "last_onnx_op": "resnetv17_stage1_relu0_fwd__1", "strategy_applied": ["split_io", "dupl_wb"], "external_strategy_hints": ["split_io", "dupl_wb"]},
  {"id": 5, "op": "CONV", "to_layer_ids": [6], "first_onnx_op": "resnetv17_stage1_conv1_fwd", "last_onnx_op": "resnetv17_stage1_relu1_fwd__1", "strategy_applied": ["split_io", "dupl_wb", "DIRECTCONV"], "external_strategy_hints": ["split_io", "dupl_wb"]},
  {"id": 6, "op": "CONV", "to_layer_ids": [7], "first_onnx_op": "resnetv17_stage1_conv2_fwd", "last_onnx_op": "resnetv17_stage1_batchnorm2_fwd__1", "strategy_applied": ["split_io", "dupl_wb"], "external_strategy_hints": ["split_io", "dupl_wb"]},
  {"id": 7, "op": "SUM", "to_layer_ids": [8, 11], "first_onnx_op": "resnetv17_stage1__plus0__1", "last_onnx_op": "resnetv17 stage1_activation0__1", "strategy_applied": ["split_io"], "external_strategy_hints": ["split_io"]},
  {"id": 8, "op": "CONV", "to_layer_ids": [9], "first_onnx_op": "resnetv17_stage1_conv4_fwd", "last_onnx_op": "resnetv17_stage1_relu2_fwd__1", "strategy_applied": ["split_io", "dupl_wb"], "external_strategy_hints": ["split_io", "dupl_wb"]},
  {"id": 9, "op": "CONV", "to_layer_ids": [10], "first_onnx_op": "resnetv17_stage1_conv5_fwd", "last_onnx_op": "resnetv17_stage1_relu3_fwd__1", "strategy_applied": ["split_io", "dupl_wb", "DIRECTCONV"], "external_strategy_hints": ["split_io", "dupl_wb"]}
  . . . ]}

It is appreciated that the third level backend compiler 226 similar to the first and second level backend compilers 222 and 224 also generates a structured metadata 227. The structured metadata 227 provides information regarding the operations/decisions performed/made by the third level backend compiler 226. It is appreciated that the output of the third level backend compiler 226 is input to the subsequent level backend compiler(s). It is appreciated that the structured metadata 227 generated by the third level backend compiler 226 may be fed back into the third level backend compiler 226 in order to reduce the number of primitives (an example is described in FIG. 2F).

A nonlimiting example of the structured metadata 227 is shown below for illustration purposes. Below the structured metadata for DDR or OCM regions and inputs, flattening addresses, weights and bias outputs, etc., is shown. The following is a nonlimiting example of a structured metadata for convolution layer. The first part of the structured metadata provides information regarding the input, weight, bias, and outputs tensors regarding shape, format, name in original network graph and local memory allocation. Moreover, pertinent information regarding the convolution operation is given such as stride in this example. The second section of the structure metadata here provides the sequential call list of the calls to the ML-library and the specific arguments.

//inputs: [
//{N: 1, inH: 32, inW: 32, inC: 1, inCStride: 1, dataFormat: NHWC, name: permute_input_0, ddr_addr: 0x36780}
//],
//stride: [1, 1],
//flattening: {ocm_addr_start: 0xfd5c0, ocm_addr_end: 0xff400},
//weight: {outC: 64, kH: 3, kW: 3, inC: 1, name: mrvl_1_const_0, ddr_addr: 0x180, ocm_addr_start: 0x0, ocm_addr_end: 0x7ff},
//bias: {kind: FP32, outC: 64, name: mrvl_1_const_1, ddr_addr: 0x0, ocm_addr_start: 0x800, ocm_addr_end: 0x8ff},
//outputs: [
//{N: 1, outH: 30, outW: 30, outC: 64, outCStride: 64, name: mrvl_1_Conv2D, ocm_addr_start: 0xe11c0, ocm_addr_end: 0xfd400}
//],
//mllib_call_list: [
//{layer_id: 2, inst_id: 1, name: Input, type: F_ACTIV, instrType: DDRTOLOCALCOPY_LINEAR_SEGMENTED_PERTILE,
//tilemask: 0x1, ddrStartAddr: 0x36780, localStartAddr: 0xff7c0, length: 2048,
//tileOffset: 2048, signExt: 0},
//{layer_id: 2, inst_id: 4, name: Flatten_Lamm_Overlap, type: F_FLATTEN_OVERLAP, instrType: OVERLAP_FLAT1,
//tilemask: 0x1, localStartAddr: 0xff7c0, localOutputAddr: 0xfd5c0,
//inH: 32, inW: 32, inC: 1, kH: 3, kW: 3, kC: 1, lineStride: 1, tileOffset: 4294967295},
//{layer_id: 2, inst_id: 10, name: Flatten_Lamm_Overlap, type: F_LAMM, instrType: OVERLAP_MULT1,
//tilemask: 0x1, numRow: 64, arowBcol: 9, numCol: 60, amtxAddr: 0x0, bmtxAddr: 0xfd5c0, cmtxAddr: 0xe11c0, biasAddr: 0x800,
//rscale: 1, rshift: 0, dscale: 1, qscale: 1, doRelu: 1, doTanh Sigmoid: 0, tileOffset: 4294967295},
//{layer_id: 2, inst_id: 19, name: Flatten_Lamm_Overlap, type: F_FLATTEN_OVERLAP, instrType: OVERLAP_FLAT1,
//tilemask: 0x1, localStartAddr: 0xff7c0, localOutputAddr: 0xfd5c0,
//inH: 32, inW: 32, inC: 1, kH: 3, kW: 3, kC: 1, lineStride: 1, tileOffset: 4294967295},
//{layer_id: 2, inst_id: 25, name: Flatten_Lamm_Overlap, type: F_LAMM, instrType: OVERLAP_MULT1,
//tilemask: 0x1, numRow: 64, arowBcol: 9, numCol: 60, amtxAddr: 0x0, bmtxAddr: 0xfd5c0, cmtxAddr: 0xe11c0, biasAddr: 0x800,
//rscale: 1, rshift: 0, dscale: 1, qscale: 1, doRelu: 1, doTanh Sigmoid: 0, tileOffset: 4294967295},
//{layer_id: 2, inst_id: 34, name: Flatten_Lamm_Overlap, type: F_FLATTEN_OVERLAP, instrType: OVERLAP_FLAT1,
//tilemask: 0x1, localStartAddr: 0xff7c0, localOutputAddr: 0xfd5c0,
//inH: 32, inW: 32, inC: 1, kH: 3, kW: 3, kC: 1, lineStride: 1, tileOffset: 4294967295}, Another example of a structured metadata 227 is shown below for illustration purposes. In the example below the strategy to map to 8 tiles is illustrated and illustrates how the input tensor is split among the tiles, rebalanced, haloed, and how the output tensors are split after computation. In this nonlimiting example, the maxpool layer is executed in parallel on 8 tiles. Here, the structured metadata provides information regarding the applied strategy and the mapping information of the data across 8 tiles when a row-wise split is applied. Moreover, the information includes the number of rows including padded rows as well as the number of halo rows on each tile.

//Layer 3: MAXPOOL-INT8
//**********
//INSTRUMENTATION_BEGIN
//json_annotation: {
//strategy_plan: {split_io: yes, split_wb: no, split_in_time: no, overlap: no}
//code_gen: {io: split_io, wb: unknown},
//mapping_info: {
//batch_size: 1,
//per_batch_num_tiles: 8,
//per_batch_mapping_list: [
//{tid: 0, input: 14, padded: 15, to_nxt: −1, halo: 1, image: 15, y_steps: 7, x_steps: 56, output: 7},
//{tid: 1, input: 14, padded: 14, to_nxt: −1, halo: 1, image: 15, y_steps: 7, x_steps: 56, output: 7},
//{tid: 2, input: 14, padded: 14, to_nxt: −1, halo: 1, image: 15, y_steps: 7, x_steps: 56, output: 7},
//{tid: 3, input: 14, padded: 14, to_nxt: −1, halo: 1, image: 15, y_steps: 7, x_steps: 56, output: 7},
//{tid: 4, input: 14, padded: 14, to_nxt: −1, halo: 1, image: 15, y_steps: 7, x_steps: 56, output: 7},
//{tid: 5, input: 14, padded: 14, to_nxt: −1, halo: 1, image: 15, y_steps: 7, x_steps: 56, output: 7},
//{tid: 6, input: 14, padded: 14, to_nxt: −1, halo: 1, image: 15, y_steps: 7, x_steps: 56, output: 7},
//{tid: 7, input: 14, padded: 15, to_nxt: 0, halo: 0, image: 16, y_steps: 7, x_steps: 56, output: 7},
//],
//},
//inputs: [
//{N: 1, inH: 112, inW: 112, inC: 64, inCStride: 64, dataFormat: NHWC, name: resnetv17_relu0_fwd__1, ocm_addr_start: 0xe3fc0, ocm_addr_end: 0x100000}
//],
//pad: {top: 1, left: 1, bottom: 1, right: 1, ocm_addr_start: 0xc9340, ocm_addr_end: 0xe3f3f},
//stride: [2, 2],
//kernel: {kH: 3, kW: 3, name: data},
//outputs: [
//{N: 1, outH: 56, outW: 56, outC: 64, outCStride: 64, name: resnetv17_pool0_fwd__1, ocm_addr_start: 0xf9dc0, ocm_addr_end: 0x100000}

Other level backend compilers may perform other operations and make other decisions. For example, other backend level compilers may perform functions based on specified attributes for the primitives, e.g., forming a set of common ML library and application peripheral interface (APIs), in order to generate ISA tasks codes to fulfill the need for all primitives for the ML hardware 160. In some nonlimiting examples, based on specified ML library APIs with their arguments, the particular level backend compiler may generate the appropriate ISA task codes to utilize the ML hardware 160 in a streaming fashion, as an example. It is appreciated that for each ML library API with its arguments, a per ML library API roofline model is used, at the time that the code is being generated, to estimate the target specific runtime performance and to monitor and check performance with respect to each ISA instruction, and/or to determine boundary violations (attributes that lead to memory wrap around or data hazard ISA instructions being produced due to memory address reuse). It is appreciated that at the time that the compiler calls the ML library API, the arguments to the library call have all the pertinent information regarding tensors and the arithmetical operations to be performed. Thus, a roofline model can be computed for this specific API call which will provide an estimate target specific runtime of these arithmetical operations. Accordingly, the compiler can iteratively decide on which API to call in cases where multiple different APIs are available to perform the same arithmetical operations. In some nonlimiting examples, other operations/decisions may include a model binary analyzer subcomponent that performs an overall analysis to identify potential problems in the low-level instructions (i.e. generate model binary), e.g., ill-formed OCM memory overlapping between ISA tasks/instructions, data hazard between consumer-producer tasks, etc. It is appreciated that these other level backend compilers may also generate their respective structured metadata that provide information regarding the operations/decisions performed/made by their respective level backend compiler. It is appreciated that the generated structured metadata and other output from other backend compilers are input to the Nth level backend compiler 228 as an input.

The Nth level backend compiler 228 in some nonlimiting examples performs ahead of time (AOT) inference on the ML hardware 160 accelerators and/or other processing units (e.g., CPU). In some examples, the Nth level backend compiler 228 generates performance statistics for the inference run associated with the ML hardware 160. The Nth level backend compiler 228 may decide on whether to perform AOT on the ML hardware 160, on its software emulator, or on a full machine emulator with the ML hardware 160 submodules. Based on the performance statistics, certain aspects of the system may be optimized, e.g., calibrate and optimize the generated code, the primitives, etc. It is appreciated that the Nth level backend compiler 228 also generates the low-level instructions for execution by the ML hardware 160. The Nth level backend compiler 228 also generates a structured metadata 229. The structured metadata 229 provides information regarding the operations/decisions performed/made by the Nth level backend compiler 228.

It is appreciated that even though not shown, one or more outputs of a given level backend compiler may be fed as a feedback loop into itself or to a preceding level backend compiler. For example, in some nonlimiting examples the output of the third level backend compiler 226 may be fed back into itself for optimization while the output of the Nth level backend compiler 228 may be fed back into the first level backend compiler 222, the third level backend compiler 226, etc. It is also appreciated that one or more of the level backend compilers may receive additional data from a source other than other level backend compilers.

Referring now to FIG. 2C, auto-layer identification in a subgraph according to some embodiments is shown. The received pre-trained network of the ML model once processed may be illustrated as the graph of nodes 252 and subsequently split into sub-graphs 254 and 256 for illustration purposes that is described in greater detail below.

In this nonlimiting example, the ML hardware (i.e., accelerator) may be integrated with a ML compiler framework such as TVM that supports Bring Your Own Codegen (BYOC), thereby enabling the TVM ecosystem to become available to users of the ML hardware. In this nonlimiting example, the ML hardware may be an ML/AI inference accelerator (MLIP) and may be embedded in a processor, e.g., CPU, GPU, field programmable gate array (FPGA), etc. In other words, the ML model, e.g., pre-trained network, that is received may be split across multiple devices, e.g., an accelerator (hereinafter ML hardware) and a general processor such as a CPU or GPU, etc. In one nonlimiting example, the ML model may be received (e.g., loaded) and processed by the frontend compilation and code-gen AOT.

The pre-trained network of the ML model, mentioned above, is shown in FIG. 2D. Please note that the pre-trained network of the ML model in this nonlimiting example illustrated in FIG. 2D is for illustrative purposes and should not be construed as limiting the scope of the embodiments.

Figure 2D:
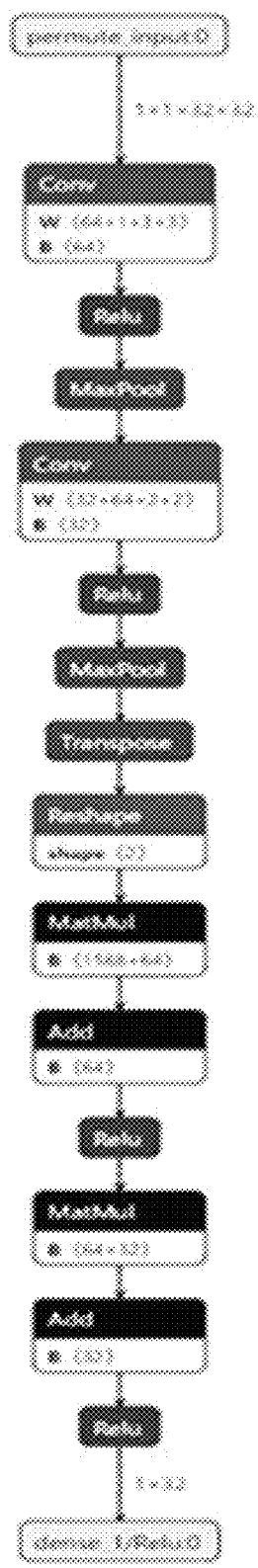

The example of the pre-trained network of the ML model in FIG. 2D is a convolution neural network (CNN) model that is mapped to internal representation and to layers to be used by the compiler 120 to generate low-level instructions to be executed on the ML-specific hardware 160 and/or other general processors, e.g., CPU, GPU, FPGA, etc. The pre-trained network of the ML model may include a plurality (e.g., tens, hundreds, or thousands) of ML operations described in high-level code. In this nonlimiting example, the pre-trained model is a complex model such as ResNet50_SSD. It is appreciated that the high-level code may include a plurality of high-level functions/operators each called at one or more lines in the high-level code. For a non-limiting example, an ML operation can be a dense and/or regular operation, e.g., a matrix operation such as multiplication, matrix manipulation, tanh, sigmoid, etc. For another non-limiting example, an ML operation can be a sparse or irregular operation, e.g., memory transpose, addition operation, operations on irregular data structures (such as trees, graphs, and priority queues), etc. In some embodiments, the ML network model can be represented by a neural network used for ML applications, wherein the neural network can be complex and huge in size. For non-limiting examples, the neural network can be but is not limited to one of a CNN, a recurrent neural network (RNN), a gradient boosting machine (GBM), and a generative adversarial neural network.

In some embodiments, the compiler may process the received ML network model and identify a plurality of well-defined boundaries for input and output in the ML network model based on a set of primitives. It is appreciated that the set of primitives may refer to a set of functions, units, and/or operators that are basic, generic, and essential (in contrast to specialized) to the ML operations of the ML network model. It is appreciated that each of the primitives may invoke one or more library function calls to an ML library to generate low-level instructions to be executed on a hardware. For a non-limiting example, a library function may be called to perform a matrix-matrix-multiplication of two matrices of given sizes and the ML library returns the set of low-level instructions that are needed to perform this library function, wherein the set of low-level instructions includes one or more of loading data from a memory, e.g., OCM, into registers, executing dot-product, and storing the data back into the memory.

Once the plurality of well-defined boundaries are identified, the compiler partitions the ML network model into a plurality of units/layers/graph/sub-graphs based on the plurality of well-defined boundaries. In some embodiments, the boundaries are defined by one or more leaf nodes of the graphs, e.g., graph 252, where each leaf node corresponds to an ending edge of a layer (which corresponds to one or more nodes) created by the compiler by executing one or more primitive functions/operators on one or more hardware components. In some embodiments, the well-defined boundary of the layer corresponds to executing last primitive function/operator in a graph on the hardware components for the layer. In some embodiments, the functionality of this last primitive function/operator can also be mapped back to its corresponding one or more ML operations in the ML network model.

The compiler then generates an internal/interim representation for each of the plurality of units/nodes of the graph 252. In this nonlimiting example nodes 1-9 and a-p are executable nodes of an ML layer. The compiler has knowledge of the architecture of the ML hardware, architecture of general processing units such as CPU, GPU, FPGA, etc., respective configurations, and software/system requirements etc. In some embodiments, the type of operations within a graph and/or the amount of processing/computation may be used to determine a hardware target selection, e.g., ML hardware as opposed to a general processor. It is appreciated that the compiler may split the original model graph into sub-graphs based on the type of operation and/or latency, as nonlimiting examples. In some embodiments, the compiler may recognize operators (i.e., network layers) of the graph and whether the recognized operators are supported by the ML hardware or not. Any operator of the graph that is unsupported by the ML hardware may be flagged by the compiler and partitioned into a sub-graph for execution by a general processor. In this nonlimiting example, the graph 252 shows executable nodes where nodes (i.e. e, j, k, n, o) that are not supported or unsuited for execution on the ML hardware 160 are shaded for illustration purposes. According to some embodiments, operators of the graph that are supported by the ML hardware may still be partitioned and split into a sub-graph for execution by a general processor to reduce latency, data movement between two sub-graphs, etc. In other words, the compiler may determine that unsupported operators/nodes that have been flagged along with some unflagged nodes should be split into a sub-graph for execution by a general processor to improve processing and achieve certain efficiencies, e.g., reduce data movement, reduce latency, etc. In some embodiments, the compiler is configured to estimate the computing cost of each node (e.g., when executed on the ML hardware as opposed to a general processor) and communication cost for data movement (e.g., between the ML hardware and the general processor). The compiler may split the graph into sub-graphs based on the estimated computing cost, etc., in order to achieve certain efficiencies in processing the ML model. Operators that are supported by the ML hardware and that can be executed efficiently by the ML hardware are formed into a different sub-graph for execution by the ML hardware. It is appreciated that it may be desirable to split the graph into the least number of sub-graphs, e.g., 2 sub-graphs.

In this nonlimiting example, the first subgraph 254 is created based on nodes that are suited for execution on the ML hardware 160 layer (e.g., not only supported but also efficient to be executed by the ML hardware 160). The second subgraph 256 is created based on nodes that contains nodes that are better suited for execution on a processor other than the ML hardware 160. In this example, the first level backend compiler 222 has determined that even though nodes d, f, h, m, l, and p are executable on the ML hardware 160 (e.g., native to the ML hardware 160), it is more efficient for them to be executed on a non-ML hardware component, e.g., CPU, along with other nodes, e.g., e, j, k, n, o. It is appreciated that the nodes e, j, k, n, and o may be nonnative to the ML hardware 160 and as such better suited to be executed by a different component. Efficiency on the node being executed on the ML hardware or a general processor may be determined based on latency, amount of data movement, etc. Also, since nodes f, h, l, m, and p are intertwined in such a way with nodes e, j, k, n, and o that increases the overhead (e.g., storage, data movement, processing, etc.) the first level compiler 222 may determine that it is more efficient for those node layers to be executed with nodes e, j, k, n, and o. As such, nodes f, l, h, m, and p are defused back to original intermediate data (i.e. intermediate representation) operations. The defused nodes are illustrated as f", l", h", m", and p". Moreover, it is appreciated that the output from nodes c, i, and d from subgraph 254 is input to subgraph 256.

Figure 2E:
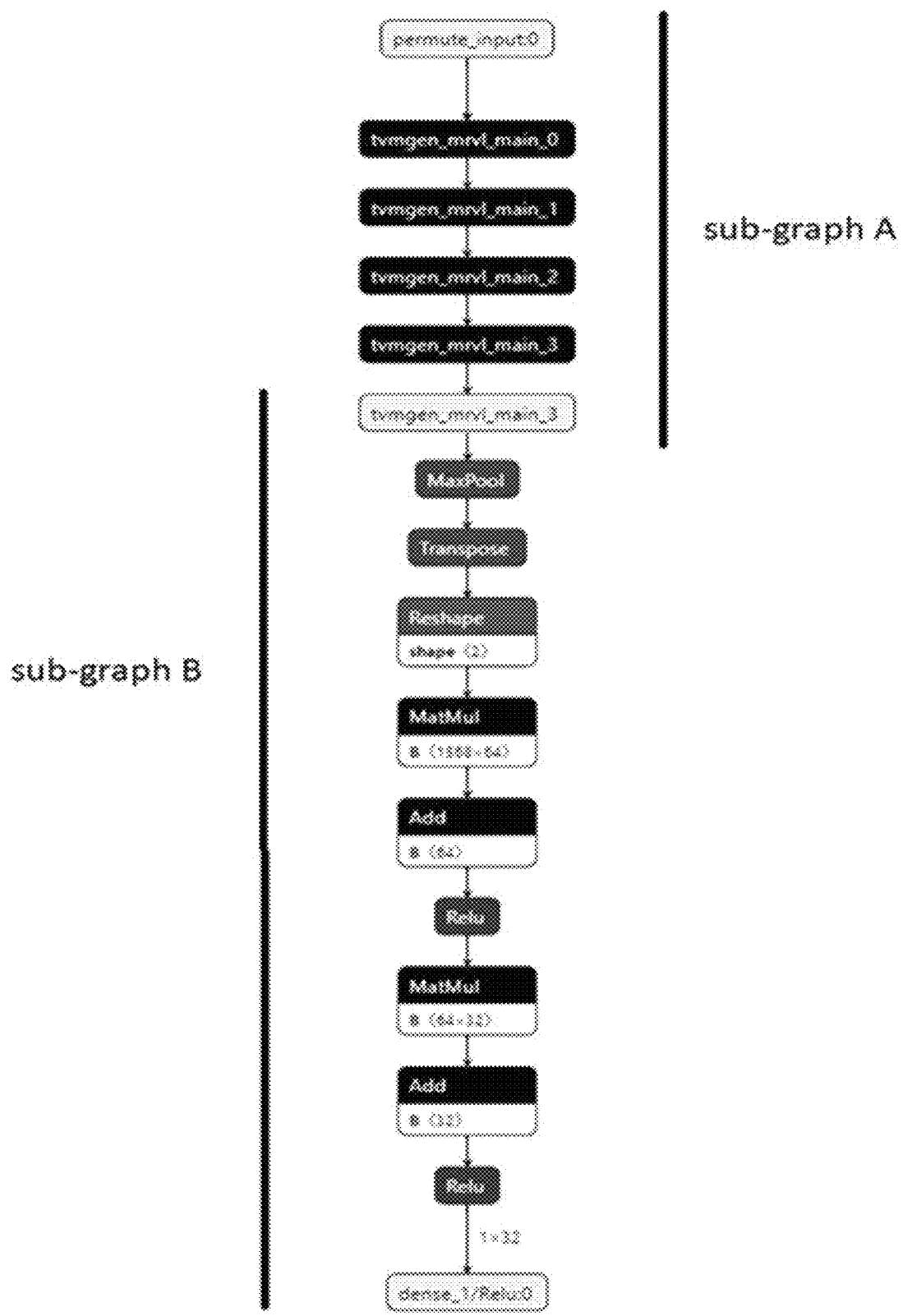

As described above, the first level backend compiler 222 may make a determination to split the graph of nodes 252 to two subgraph nodes 254 and 256, as illustrated on the right hand side, the input output node pairs of the sub-graphs are generated, e.g., output of one sub-graph from a general processor to input of one sub-graph of an ML hardware for example. In other words, the generated input/output node pairs to connect the sub-graphs is a representation of the original model graph. In some embodiments, the subgraph nodes 254 will be executed by the ML hardware 160 and the subgraph nodes 256 will be executed by a processing component other than the ML hardware 160, e.g., a CPU. As such, the internal representation of the sub-graph 254 is mapped to the ML hardware or ML software emulator and the internal representation of the sub-graph 256 is mapped to a general processor. The ML model that is split into sub-graphs is shown in FIG. 2E for illustration purposes and should not be construed as limiting the scope of the embodiments.

As described above, the ML hardware is a dedicated hardware including one or more microprocessors and/or OCM units storing the data and/or the first set of low-level instructions to perform the plurality of ML operations. The internal representation of sub-graph 256 is mapped to one or more components in a general-purposed computing device (e.g., a general CPU or GPU), a special-purposed hardware (e.g., another (second) ML hardware that is different from the (first) ML-specific hardware), or a software simulator or emulator of a hardware, or a combination of the ML hardware and ML hardware emulator. In some embodiments, the ML hardware and the general-purposed computing device may be separate devices even though they may be integrated on a same physical device.

It is appreciated that each sub-graph may be optimized. For example, the compiler may perform target specific transformations and optimizations on each sub-graph. It is appreciated that because the target associated with each sub-graph may be different, e.g., ML hardware, ML emulator, general processor, etc., their resources and/or architecture are also different, e.g., memory, processing units, etc. As such, each sub-graph may undergo a different transformation and/or optimization depending on the target that will be executing the code generated for the sub-graph. As such, the pre-trained ML model is processed in an efficient and optimized fashion.

In some embodiments, partitioning a graph into subgraphs in an automated fashion and in a more intelligent fashion, as described, based on respective target capabilities and resources improves the processing speed, reduces the required resource, and/or reduces latency. In other words, the original model graph is partitioned based on analysis of optimization/transformation that closely maps to the target hardware, e.g., ML hardware, ML emulator, general processor, etc., thereby enabling detailed computation and communication estimates, which is based on resources such as processing power and data movement, etc. Expressing the original model as sub-graphs, as described, enables the compilation process to be automated such that the model can be executed (i.e., inferred) in a time efficient and resource efficient manner. In some embodiments, a self-tuning capability to perform graph partitioning, compiling, and performing inference run analysis. In yet other embodiments, manual interference by a user may be provide in addition to the automated compilation and partitioning. As such, partitioning the original model graph into sub-graphs, as described, reduces latency by reducing unnecessary memory (or hierarchy) access, reducing unnecessary data movement, etc., in comparison to the conventional system.

It is appreciated that the embodiments for splitting the graph into subgraphs such that one subgraph is executed by the ML hardware and one subgraph is executed by a general processor is for illustrative purposes and should not be construed as limiting the scope of the embodiments. For example, the embodiments are equally applicable to splitting the graph into subgraphs where one subgraph is executed by a software emulator (emulation of ML hardware) and where the other subgraph is executed by a general processor. As such, discussions with respect to the subgraph being executed by the ML hardware is for illustrative purposes and should not be construed as limiting the scope of the embodiments. It is appreciated that in some embodiments, the subgraphs created for execution by ML hardware and the general processor may be compiled using the same compiler or by using different compilers.

Figure 2F:
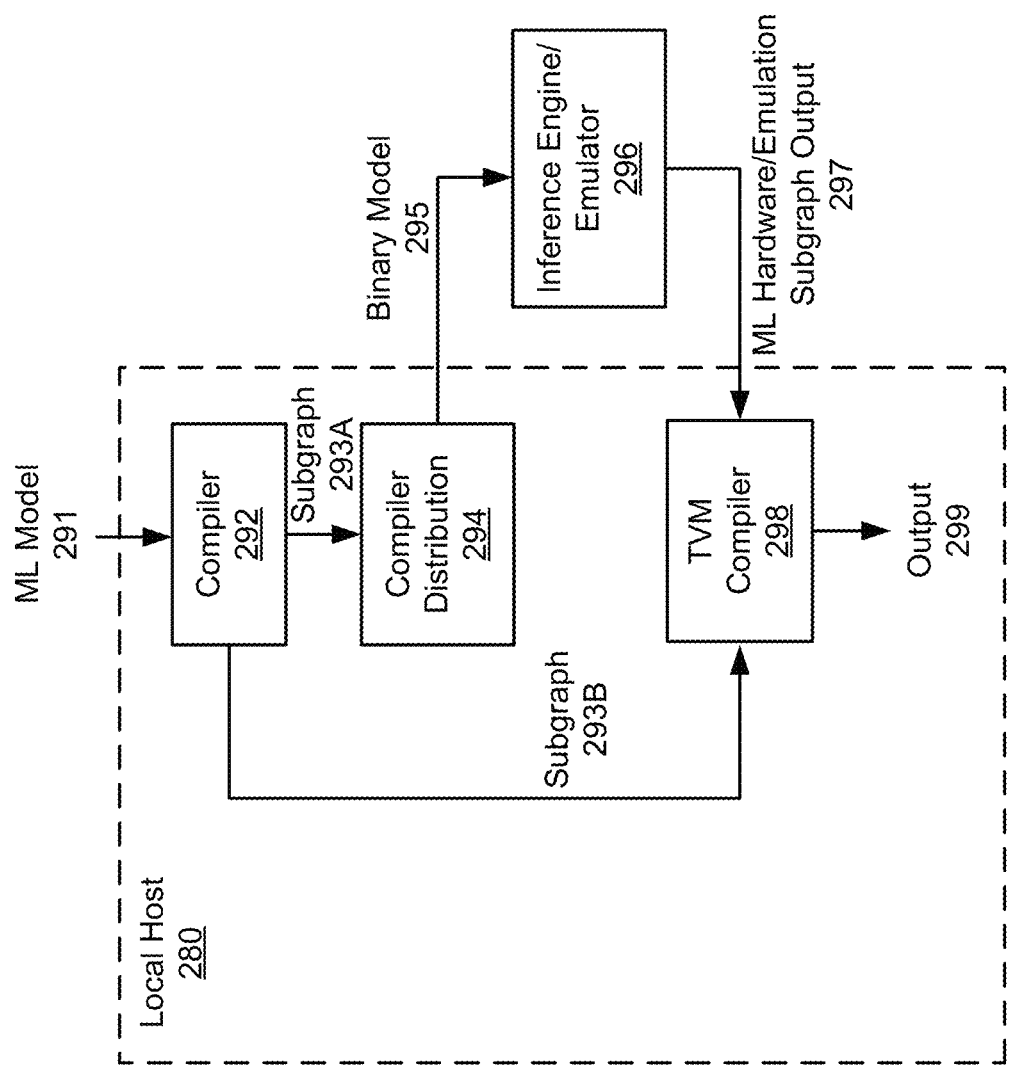

Referring now to FIG. 2F, a nonlimiting example of a compilation and splitting a graph into subgraphs according to one aspect of the present embodiments is shown. In this nonlimiting example, the ML hardware may be an ML/AI inference accelerator and may be embedded with the processor of the local host 280. In this nonlimiting example, the use of a TVM compiler 298 is described for illustrative purposes and should not be construed as limiting the scope of the embodiments.

As shown by the example of FIG. 2F, the local host 280 may include a compiler 292, a compiler distribution 294 unit, and a TVM compiler 298. The local host 280 may include a general processor such as a CPU. In one nonlimiting example the inference engine/emulator 296 is a software emulation and is executed within the local host 280 and in one nonlimiting example the inference engine/emulator 296 is an ML hardware and is separate from the local host 280 even though they may be integrated as a single unit. It is appreciated that the compiler 292 may be similar to the compiler 120, as described above.

In some embodiments, the compiler 292 may receive the ML model 291, e.g., pre-trained ML model, as described above. For example, the pre-trained ML model may be loaded. The compiler 292 processes the ML model 291 to generate internal representation graph, e.g., graph 252 as described above. The graph 252 may include meta data representation and as such not only capture the structure and attributes but also functionality and usage of the ML model 291. It is appreciated that the compiler 292 may perform hardware specific layout conversion in order to transform the graph to meet specific requirements of the hardware, e.g., ML hardware, general processor, etc. It is appreciated that in some embodiments, the compiler 292 may perform certain optimizations, e.g., merging/fusing, additional transformation, etc.

According to some embodiments, the compiler 292 may partition the graph into subgraphs, e.g., subgraph 254 and 256, as described above. In this nonlimiting example, the compiler 292 partitions the graph into subgraphs based on whether the node/operation is supported by the ML hardware or not and even if it is supported whether the data movement and latency can be improved by including it in a subgraph for the general processor as opposed to the subgraph for the ML hardware. Accordingly, the compiler 292 generates subgraphs, one subgraph for the ML hardware and one subgraph for the general processor to be compiled by the TVM compiler 298. As described above, at least a pair of input/output nodes are added to the subgraphs when the graph is being partitioned. Accordingly, the subgraphs cover the entire ML model 291. In this nonlimiting example, the subgraph 293A is created to be processed by the ML hardware, e.g., inference engine/emulator 296, whereas the subgraph 293B is created to be compiled by the TVM compiler 298 and processed by the general processor of the local host 280. It is appreciated that in one nonlimiting example, the ML hardware may only use input tensors of a given pre-trained network as its subgraph input tensor. ML hardware specific attributes may be introduced for each node of the subgraph 293A, thereby generating files and constants, e.g., JavaScript Objection Notation (JSON) format.

In some embodiments, the subgraph 293A and the ML hardware specific attributes for each node, in this nonlimiting example as JSON file and constants, are used by the compiler distribution 294 unit to distribute the compiler, e.g., backend compiler, as an executable in the ML/AI tar ball. Accordingly, the nodes JSON and constants JSON files for each node of the subgraph 293A along with meta data may be used by the compiler distribution 294 to generate the final instruction, e.g., in binary.

The binary model 295 is generated and transmitted to the inference engine/emulator 296. It is appreciated that the inference engine may be the ML hardware, as described above that executes the binary model 295. In some nonlimiting example, instead of using the ML hardware an emulator may be used. The emulator may be executed by the processor of the local host 280 whereas the ML hardware may execute the binary model 295 independent from the local host 280. In this nonlimiting example, the inference engine/emulator 296 runs inference in float 16 mode or int8 quantization mode.

The inference engine/emulator 296 generates the ML hardware/emulation subgraph output 297 which is input into the TVM compiler 298. The TVM compiler 298 also receives the subgraph 293B and compiles that into binary. The compiled binary of the subgraph 293B and the ML hardware/emulation subgraph output 297 are used to generate the output 299.

Referring now to FIG. 2G, a nonlimiting example of a decision/operation by the third level backend compiler is shown. In this example, the third level backend compiler 226 determines whether to use LAMM or SAMM and whether to split input/output on tiles, split weight/bias on tiles, combination of split input/output and weight/bias and serialization on tiles, overlap primitives on tiles, for a multiplication. It is appreciated that in some nonlimiting examples, the third level backend compiler 226 may determine that LAMM is better suited as opposed to SAMM when a batch size is 8 because it requires no transpose but SAMM does, which requires copying and as such increases the execution time. In some embodiments, the weight and the input size is also factored into the decision being made of the third level backend compiler 226. The table of FIG. 2D is provided as an example. Areg and Breg are registers within the POD of the ML hardware 160. Moreover, the decision may be based on whether to split I/O or to split weight.

Referring now to FIG. 2H, another example of a determination by the third level backend compiler according to some embodiments is shown. FIG. 2E illustrates strategy and mapping A and strategy and mapping B based on the configuration using different primitives for performing a convolution followed by MaxPool layer. It is appreciated that strategy A uses a flattening and Lamm overlap followed by maxpool. For illustration purposes, the PE and POD on each tile work concurrently to execute the flattening and Lamm overlap which is subsequently followed by the PE performing the maxpool operation. Strategy B uses a different approach for the convolution (DirectConv) which is executed on POD while the MaxPool is executed on PE concurrently using pipelining.

Referring now to FIG. 2I, a nonlimiting example of using a generated structured metadata by a level backend compiler to reduce the number of primitives is shown. In this example, layer A 292 may call into primitives A1 and A2 and it may fork into layer B 293 and layer C 294. In this nonlimiting example, the layer B calls into layer D and primitives B2 and B3 whereas layer C 294 calls into layer D and primitive C2. A backend compiler, e.g., the third level backend compiler 226, may optimize to reduce the number of primitives using the generated structure metadata 227. For example, the third level backend compiler 226 may determine that the layer D occurs twice and as such one can be reduced. Accordingly, the optimization may form layer A 295 calling into primitives A1 and A2 and layer D that forks into layer B 296 calling into primitives B2 and B3 and layer C 297 that calls into primitive C2. As illustrated, the call into layer D is moved into the layer A rather than being called separately by layer B and C each. As such, the structured metadata can be used by the backend compiler itself for optimization purposes.

Figure 2J:
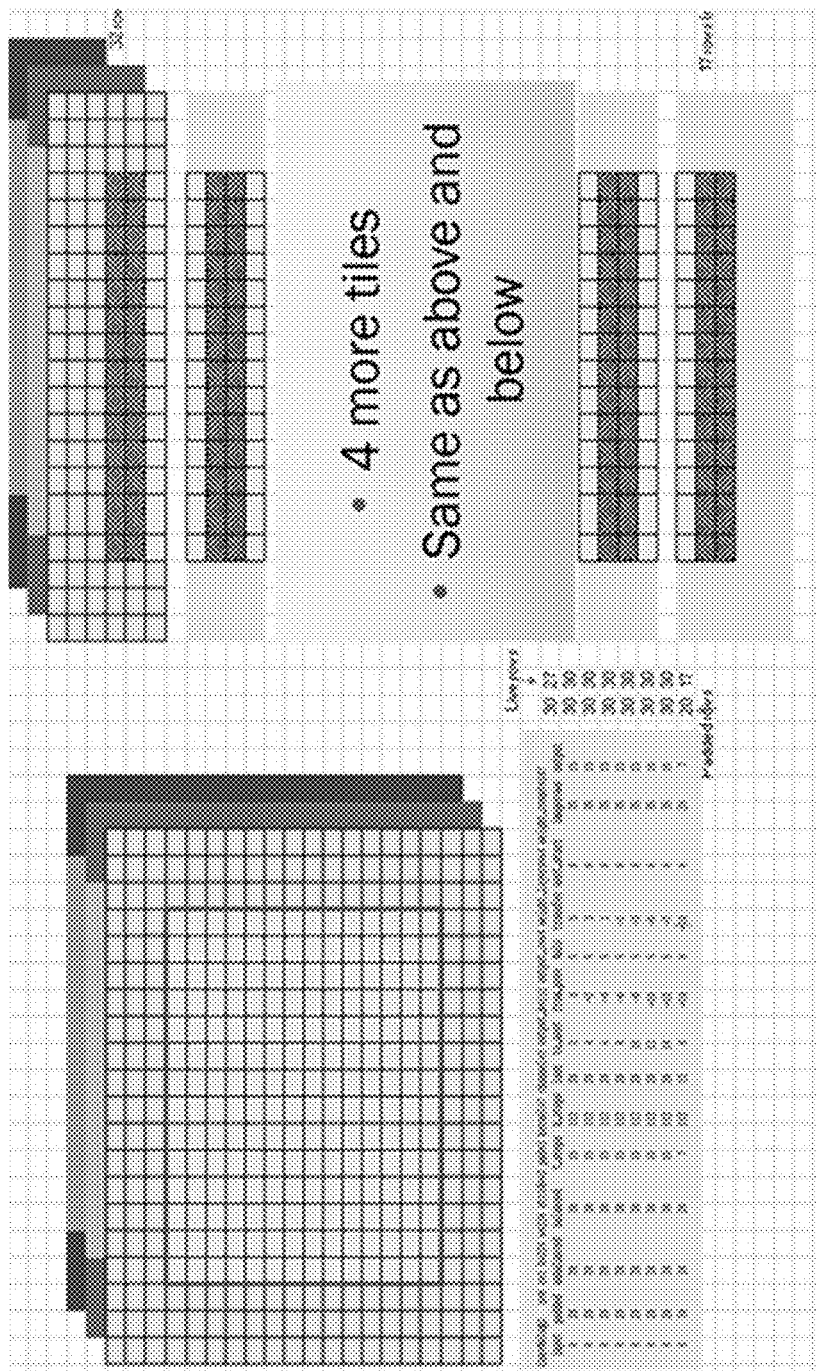

Referring now to FIG. 2J, a nonlimiting example of a backend compiler that receives a first layer in CHW format and how it maps it to the tiles and performs the required padding according to some embodiments is shown. In some examples, the first layer is received as an input in CHW format and it may be transposed to HWC format (as described above) as part of the flattening process that is natural form for the POD. In this example, the size of the padding is 3 and the input is in CHW form for a batch size of 3×224×224. It is appreciated that in some embodiments, no flattening may be needed and as such the transpose might be needed as part of the output of the previous layer or as a separate step in the input layer. In this nonlimiting example, the slicing to map to the tiles is a batch of 8 across 64 tiles, each input is split across 8 tiles and is row-wise (i.e., <35, 35, 35, 35, 35, 35, 35, 19> for tiles <7, . . . , 0>.

As described above, the backend compiler may generate one or more structure metadata. Below is another example of a code followed by the backend compiler generated metadata that illustrates the input, the weight, and the bias constants and output for a fp16 network for illustration purposes. In this nonlimiting example, a convolution layer in a network that is reduced to fp16 precision is illustrated. The structured metadata first describes the tensors involved in this operation in addition to operator specific arguments such as padding and stride information. The total number of multiply and accumulate (MAC) instructions are given. The second part of the structured metadata describes the memory layout of the tensors.

Layer 1: Conv
  Input[1]: float16, [batch, inC, H, W]=[1, 1, 32, 32]
  Weight: float16, [outC, inC, H, W]=[64, 1, 3, 3]
  Bias: float, [64]
  Padding: [top, left, bottom, right]=0, 0, 0, 0
  Stride: [h, w]=[1, 1]
  Activation: relu
  output: float16, [batch, H, W, outC]=[1, 30, 30, 64]
  # of MACs: 1036800
  # of Parameters: 640
//json_annotation:
//code_gen: {io: split_io, wb: dupl_wb},
//mapping_info: {
//batch_size: 1,
//per_batch_num_tiles: 8,
//},
//inputs: [
//{N: 1, inH: 32, inW: 32, inC: 1, inCStride: 1, dataFormat: NCHW, name: permute_input_0, ddr_addr: 0x36780}
//],
//weight: {outC: 64, kH: 3, kW: 3, inC: 1, name: conv2d_kernel_01, ddr_addr: 0x32300, ocm_addr_start: 0x0, ocm_addr_end: 0x7ff},
//bias: {kind: FP32, outC: 64, name: conv2d_bias_0, ddr_addr: 0x32080, ocm_addr_start: 0x800, ocm_addr_end: 0x8ff},
//outputs: [
//{N: 1, outH: 30, outW: 30, outC: 64, outCStride: 64, name: conv2d_Relu1, ocm_addr_start: 0xfc380, ocm_addr_end: 0xfffbf}
//]

Below is yet another example of a code followed by the backend compiler generated metadata that illustrates quantized network for illustration purposes. In this nonlimiting example, the same convolution layer as in the previous example is shown except that in this example a network is quantized to int8. The structured metadata first describes the tensors involved in this operation in addition to operator specific arguments such as padding and stride information. The total number of MAC instructions are given. The second part of the structured metadata describes the memory layout of the tensors.

Layer 1: Conv
  Input[1]: uint8, [batch, inC, H, W]=[1, 1, 32, 32]
  Weight: int8, [outC, inC, H, W]=[64, 1, 3, 3]
  Bias: int32, [64]
  Padding: [top, left, bottom, right]=0, 0, 0, 0
  Stride: [h, w]=[1, 1]
  Activation: relu
  output: uint8, [batch, H, W, outC]=[1, 30, 30, 64]
  # of MACs: 1036800
  # of Parameters: 640
//INSTRUMENTATION_BEGIN
//json_annotation: {
//code_gen: {io: split_io, wb: dupl_wb},
//mapping_info: {
//batch size: 1,
//per_batch_num_tiles: 8,
//},

```
//inputs: [
//{N: 1, inH: 32, inW: 32, inC: 1, inCStride: 1, dataFor-
    mat: NCHW, name: permute_input_0, ddr_addr:
    0x1b540}
//],
//weight: {outC: 64, kH: 3, kW: 3, inC: 1, name:
    conv2d_kernel_01,    ddr_addr:    0x19300,
    ocm_addr_start: 0x0, ocm_addr_end: 0xffff},
//bias: {kind: INT32, outC: 64, name: conv2d_bias_0,
    ddr_addr: 0x19080, ocm_addr_start: 0x1000, ocm_ad-
    dr_end: 0x10ff},
//outputs: [
//{N: 1, outH: 30, outW: 30, outC: 64, outCStride: 64,
    name:  conv2d_Relu1,  ocm_addr_start:  0xfe180,
    ocm_addr_end: 0xfffbf}
//]
```

As yet another example, the code as generated by the backend compiler and its structured metadata is shown below for illustration purposes. In this nonlimiting example a low-level ISA instructions to be executed on ML hardware 160 is shown which is augmented with the structured metadata that are provided as comments that are excluded at runtime by the hardware.

```
//**********
//Layer 2: CONV-INT8
//**********
//INSTRUMENTATION_BEGIN
//json_annotation: {
//strategy_plan: {split_io: yes, split_wb: no, split_
    in_time: no, overlap: no, matmul: DIRECTCONV},
//code_gen: {io: split_io, wb: dupl_wb},
//mapping_info: {
//batch_size: 8,
//per_batch_num_tiles: 1,
//per_batch_mapping_list: [
//{tid: 0, input: 16, padded: 20, to_nxt: 0, halo: 0, image:
    20, y_steps: 16, x_steps: 16, output: 16},
//],
//},
//inputs: [
//{N: 8, inH: 16, inW: 16, inC: 128, inCStride: 128,
    dataFormat: NHWC, name: input, ddr_addr: 0x32100}
//],
//pad: {top: 2, left: 2, bottom: 2, right: 2, ocm_addr_start:
    0xe93c0, ocm_addr_end: 0xf5c00},
//stride: [1, 1],
//weight: {outC: 64, kH: 5, kW: 5, inC: 128, name:
    conv2d_kernel_0_0, ddr_addr: 0x100, ocm_addr_start:
    0x0, ocm_addr_end: 0x31fff},
//bias: {kind: INT32, outC: 64, name: conv2d_bias_0,
    ddr_addr: 0x0, ocm_addr_start: 0x32000, ocm_ad-
    dr_end: 0x320ff},
//FC-fwd-gather: {ocm_addr_start: 0xc8fc0, ocm_ad-
    dr_end: 0xe9000},
//outputs: [
//{N: 8, outH: 16, outW: 16, outC: 64, outCStride: 64,
    name: conv2d, ocm_addr_start: 0xc8fc0, ocm_ad-
    dr_end: 0xe9000, ddr_addr: 0x72100}
//],
//mllib_call_list: [
//{layer_id: 2, inst_id: 1, name: Input, type: F_ACTIV,
    instrType:    DDRTOLOCALCOPY_LINEAR_SEG-
    MENTED_PERTILE,
//tilemask: 0xff, ddrStartAddr: 0x32100, localStartAddr:
    0xf5fc0, length: 32768,
//tileOffset: 32768, signExt: 1},
//{layer_id: 2, inst_id: 4, name: --Padding, type: F_PAD-
    DING, instrType: INT8_MEMSET,
//tilemask: 0xff, localOutputAddr: 0xe93c0, length: 128,
//lineStride: 128, numLines: 40, numBlks: 0, tileOffset:
    4294967295},
//{layer_id: 2, inst_id: 8, name: --Padding, type: F_PAD-
    DING, instrType: INT8_MEMSET,
//tilemask: 0xff, localOutputAddr: 0xea7c0, length: 256,
//lineStride: 2560, numLines: 18, numBlks: 0, tileOffset:
    4294967295},
//{layer_id: 2, inst_id: 12, name: --Padding, type: F_PAD-
    DING, instrType: LOCAL_FWD_SCATTER,
//tilemask: 0xff, localStartAddr: 0xf5fc0, localOut-
    putAddr: 0xea8c0, length: 128,
//lineStride: 128, numLines: 16, blkStride: 2560, numB-
    lks: 16, tileOffset: 4294967295},
//{layer_id: 2, inst_id: 16, name: --Padding, type: F_PAD-
    DING, instrType: INT8_MEMSET,
//tilemask: 0xff, localOutputAddr: 0xeb0c0, length: 256,
//lineStride: 2560, numLines: 18, numBlks: 0, tileOffset:
    4294967295},
//{layer_id: 2, inst_id: 20, name: --Padding, type: F_PAD-
    DING, instrType: INT8_MEMSET,
//tilemask: 0xff, localOutputAddr: 0xf47c0, length: 128,
//lineStride: 128, numLines: 40, numBlks: 0, tileOffset:
    4294967295},
//{layer_id: 2, inst_id: 24, name: Direct_Conv, type:
    F_DIRECT_CONV, instrType: UNKNOWN,
//tilemask: 0xff, localStartAddr: 0x0, localOutputAddr:
    0xc4bc0, srcAddr: 0xe93c0, biasAddr: 0x32000,
//inH: 20, inW: 20, inC: 128, outC: 64, kH: 5, kW: 5, kC:
    128, strideH: 1, strideW: 1, dstStride: 64, rscale:
    1347632000, rshift: 42, dscale: 1, qscale: 1, doRelu: 0,
    do Tanh Sigmoid: 0, tileOffset: 4294967295},
//{layer_id: 2, inst_id: 35, name: all2all, type: F_
    ALL_TO_ALL, instrType: COPY_REMOTE_ABS,
//tilemask: 0xff, srcAddr: 0xc4bc0, destAddr: 0xc8fc0,
    length: 64,
//numLines: 256, numBlks: 1, stTile: 0, endTile: 0,
    tileOffset: 1, groupOfTile: 8},
//{layer_id: 2, inst_id: 41, name: ALL2ALL Global Sync,
    type: F_GLOB_SYNC, instrType: COPY_REMOTE_
    ABS,
//tilemask: 0xff,
//tileOffset: 4294967295},
//{layer_id: 2, inst_id: 43, name: output, type: F_OUT-
    PUT, instrType: UNKNOWN,
//tilemask: 0x1, ddrOutputAddr: 0x72100, localOut-
    putAddr: 0xc8fc0, length: 131072,
//tileOffset: 4294967295},
//],
//}
//INSTRUMENTATION_END
//{layer_id: 2, inst_id: 1, name: Input, type: F_ACTIV,
    instrType:    DDRTOLOCALCOPY_LINEAR_SEG-
    MENTED_PERTILE,
//tilemask: 0xff, ddrStartAddr: 0x32100, localStartAddr:
    0xf5fc0, length: 32768,
//tileOffset: 32768, signExt: 1}
//1
DMATaskBcst 2 0xff 0 0 0 0 0 0 0
DMAUnrollTaskLoopPerMaskBit 1 1 1 32768 0 0 0 0
    0
DMA_DDR_to_OCM 0x32100 0xf5fc0 256 256 128
    32768 1 1
//{layer_id: 2, inst_id: 4, name: --Padding, type: F_PAD-
    DING, instrType: INT8_MEMSET,
```

```
//tilemask: 0xff, localOutputAddr: 0xe93c0, length: 128,
//lineStride: 128, numLines: 40, numBlks: 0, tileOffset:
    4294967295}
//2
PETaskBcst 3 0xff 1 0 0 0 0 0 0
PELoadRegImm 0x1 0 16 0 1 1 1
PEMove 0x1f 0x1 16 0 0 1 1 320
PEStoreStream 0xe93c0 16 16 8 128 40 0 0 0
//{layer_id: 2, inst_id: 8, name: --Padding, type: F_PAD-
    DING, instrType: INT8_MEMSET,
//tilemask: 0xff, localOutputAddr: 0xea7c0, length: 256,
//lineStride: 2560, numLines: 18, numBlks: 0, tileOffset:
    4294967295}
//3
PETaskBcst 3 0xff 1 0 0 0 0 0 0
PELoadRegImm 0x1 0 16 0 1 1 1
PEMove 0x1f 0x1 16 0 0 1 1 288
PEStoreStream 0xea7c0 16 16 16 2560 18 0 0 0
//{layer_id: 2, inst_id: 12, name: --Padding, type: F_PAD-
    DING, instrType: LOCAL_FWD_SCATTER,
//tilemask: 0xff, localStartAddr: 0xf5fc0, localOut-
    putAddr: 0xea8c0, length: 128,
//lineStride: 128, numLines: 16, blkStride: 2560, numB-
    lks: 16, tileOffset: 4294967295}
//4
PETaskBcst 3 0xff 1 0 0 0 0 0 0
Loop 2 1 2 2048 2 2 2560 0 0 0 16
PELoadStream1 0xf5fc0 64 64 2 128 16
PEStoreStream 0xea8c0 64 64 2 128 16 0 0 0
//{layer_id: 2, inst_id: 16, name: --Padding, type: F_PAD-
    DING, instrType: INT8_MEMSET,
//tilemask: 0xff, localOutputAddr: 0xeb0c0, length: 256,
//lineStride: 2560, numLines: 18, numBlks: 0, tileOffset:
    4294967295}
//5
PETaskBcst 3 0xff 1 0 0 0 0 0 0
PELoadRegImm 0x1 0 16 0 1 1 1
PEMove 0x1f 0x1 16 0 0 1 1 288
PEStoreStream 0xeb0c0 16 16 16 2560 18 0 0 0
//{layer_id: 2, inst_id: 20, name: --Padding, type: F_PAD-
    DING, instrType: INT8_MEMSET,
//tilemask: 0xff, localOutputAddr: 0xf47c0, length: 128,
//lineStride: 128, numLines: 40, numBlks: 0, tileOffset:
    4294967295}
//6
PETaskBcst 3 0xff 1 0 0 0 0 0 0
PELoadRegImm 0x1 0 16 0 1 1 1
PEMove 0x1f 0x1 16 0 0 1 1 320
PEStoreStream 0xf47c0 16 16 8 128 40 0 0 0
//{layer_id: 2, inst_id: 24, name: Direct_Conv, type:
    F_DIRECT_CONV, instrType: UNKNOWN,
//tilemask: 0xff, localStartAddr: 0x0, localOutputAddr:
    0xc4bc0, srcAddr: 0xe93c0, biasAddr: 0x32000,
//inH: 20, inW: 20, inC: 128, outC: 64, kH: 5, kW: 5, kC:
    128, strideH: 1, strideW: 1, dstStride: 64, rscale:
    1347632000, rshift: 42, dscale: 1, qscale: 1, doRelu: 0,
    do Tanh Sigmoid: 0, tileOffset: 4294967295}
//7
PodTaskBcst 10 0 0xff 1 0 0 0 0 0 0
Loop 9 2 2 32 6 2 25600 9 2 8 8
TileLoadQuantScaleConsts 1347632000 42 1 1
PDLoadBiasMM 0x32000 8 0
Loop 6 4 2 2560 6 2 1024 00 0 16
PDBcstBiastoCregMM 8 16 0
Loop 3 12 6402 2 2560 0 0 0 5
PDLoadAregMM 0x0 128 128 3200 8 128 5
PDLoadBregMM 0xe93c0 128 128 128 16 128 5
PDDotProductMM 128 128 8 16 5
PDStoreCregMM 0xc4bc0 8 64 16 0 2 0 0
//{layer_id: 2, inst_id: 35, name: all2all, type: F_ALL_
    TO_ALL, instrType: COPY_REMOTE_ABS,
//tilemask: 0xff, srcAddr: 0xc4bc0, destAddr: 0xc8fc0,
    length: 64,
//numLines: 256, numBlks: 1, stTile: 0, endTile: 0,
    tileOffset: 1, groupOfTile: 8}
//8
PETaskBcst 5 0xff 1 0 0 0 0 0 0
TileTaskParamUpdUsingTileID 4 3 2 1 0 0 0 0 0 0 8
PELoadStream1 0xc4bc0 16 16 4 64 256
PEMove 0x1f 0x1e 16 0 0 1 1 1024
PEStoreStream 0xc8fc0 16 16 4 64 256 2 0 0
PESync
//{layer_id: 2, inst_id: 41, name: ALL2ALL Global Sync,
    type: F_GLOB_SYNC, instrType: COPY_REMOTE-
    _ABS,
//tilemask: 0xff,
//tileOffset: 4294967295}
//9
PETaskBcst 1 0xff 2 0 0 0 0 0 0
PESync
```

Figure 4:
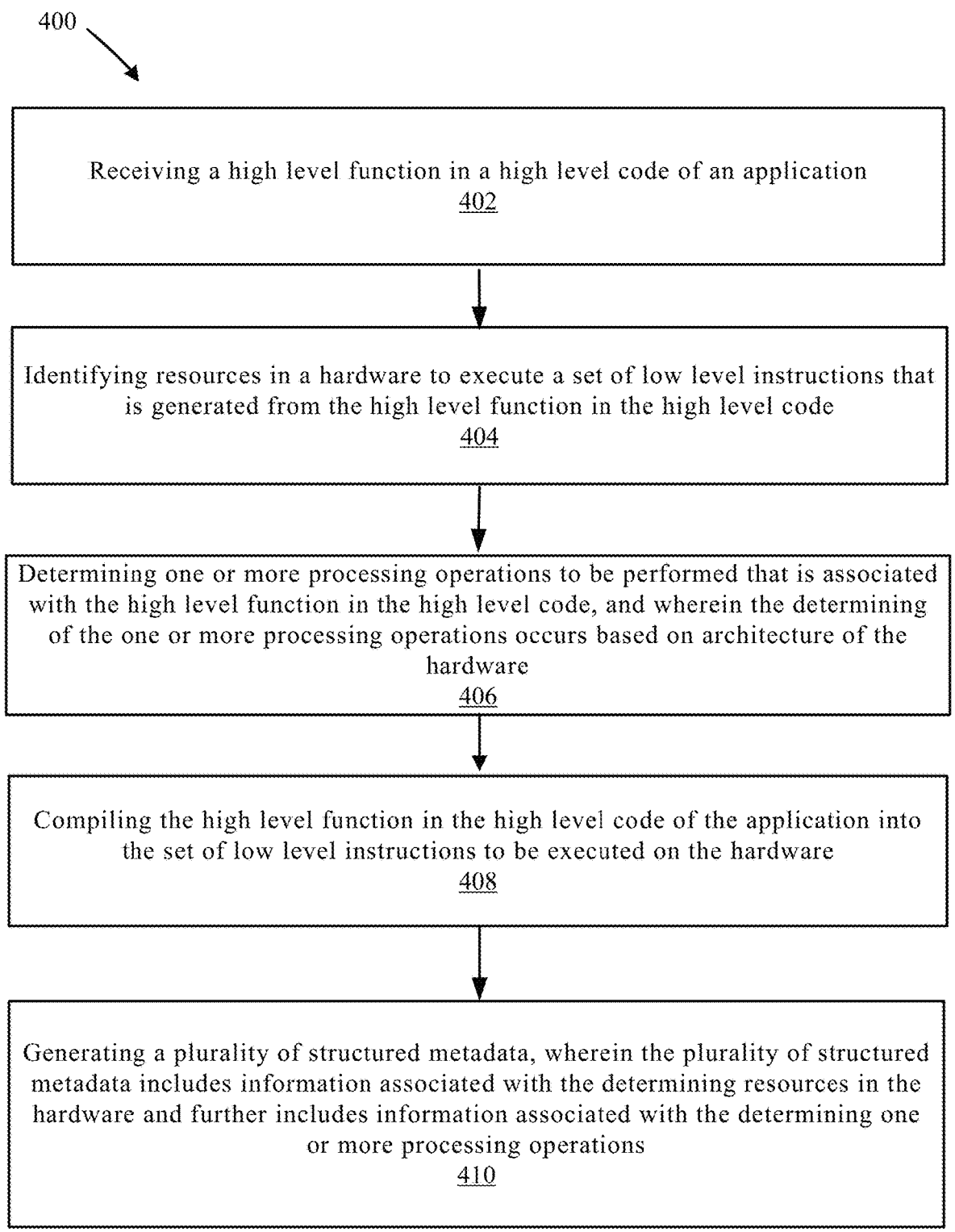
FIG. 4 depicts a flowchart of an example of a process to support generating a multi-level structured metadata when the high-level code is being compiled into low-level instructions of an application for running on ML hardware according to one aspect of the present embodiments.

FIG. 4 depicts a flowchart 400 of an example of a process to support generating a multi-level structured metadata when the high-level code is being compiled into low-level instructions of an application for running on ML hardware according to one aspect of the present embodiments. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 4, the flowchart 400 starts at block 402, where a high-level function in a high-level code of an application is received. At step 404, resources in a hardware to execute a set of low-level instructions that is generated from the high-level function in the high-level code is identified. At step 406, one or more processing operations to be performed that is associated with the high-level function in the high-level code is determined. The determining of the one or more processing operations occurs based on architecture of the hardware. At step 408, the high-level function in the high-level code of the application is compiled into the set of low-level instructions to be executed on the hardware. At step 410, a plurality of structured metadata is generated. The plurality of structured metadata includes information associated with the determining resources in the hardware and further includes information associated with the determining one or more processing operations.

It is appreciated that in some embodiments a structured metadata may be selected and fed back into one of the backend compilers in order to optimize its operation. It is further appreciated that in some embodiments the one or more processing operations is one of changing precision, quantization, dimension reordering, or splitting or copying data across one or more processing tiles of the hardware. In one nonlimiting example, the method may further include reducing data movement by using the one or more processing operations. According to some embodiments, the hardware may be a dedicated hardware block including one or more microprocessors and/or OCM units storing the data and/or the set of low-level instructions compiled from the high-level function. According to some embodiments, the method further includes reducing storage by using the one or more processing operations. In one alternative example, the method may further include reducing computations by using the one or more processing operations or reducing data conversion by using the one or more processing operations. It is appreciated that as described above, the method may further include comparing data stored in a memory location as identified by a structured metadata of the plurality of structured metadata to expected data for verification of the high-level function. In some nonlimiting examples, the method may further include comparing data stored in a memory location as identified by a structured metadata of the plurality of structured metadata to expected data and debugging of the high-level function based on the comparison. According to some embodiments, the method may further include determining resources in the hardware and mapping operations and data to one or more tiles of the hardware to execute the set of low-level instructions. It is appreciated that the method may further include optimizing the high-level function of the high-level code based on the plurality of structured metadata.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system, comprising:
    a processor; and
    a compiler executed by the processor, wherein the compiler is configured to
        receive a machine learning (ML) model;
        generate a graph associated with the ML model, wherein the graph is an internal representation of the ML model;
        partition the graph into a first subgraph and a second subgraph, wherein the first subgraph is associated with an ML hardware, and wherein the second subgraph is associated with a processor different from the ML hardware, wherein the partition is based on at least one of:
            a) whether an operation within a node of the graph is supported by the ML hardware, or
            b) latency associated with a node within the first subgraph as opposed to the second subgraph, or
            c) an amount of data movement if a node is included within the first subgraph as opposed to the second subgraph;
        generate a set of low-level instructions associated with the first subgraph; and
        identify one or more resources in the ML hardware to execute the set of low-level instructions associated with the first subgraph.

2. The system of claim 1, wherein the ML hardware is configured to execute the set of low-level instructions associated with the first subgraph and further configured to output a result of the execution of the set of low-level instructions associated with the first subgraph to another compiler.

3. The system of claim 1 further comprising another compiler configured to:
    receive the second subgraph; and
    generate a set of low-level instructions associated with the second subgraph for execution by the processor that is different from the ML hardware.

4. The system of claim 3, wherein the another compiler is a TVM compiler.

5. The system of claim 3, wherein the compiler is the same as the another compiler.

6. The system of claim 1, wherein the node that comprises an operation that is unsupported by the ML hardware is included in the second subgraph.

7. The system of claim 1, wherein the partitioning is based on at least one of (a), or (b), or (c), or (d) knowledge of architecture of the ML hardware.

8. The system of claim 1, wherein the processor different from the ML hardware is a central processing unit, a graphics pipeline unit, or a field programmable gate array.

9. The system of claim 1, wherein the processor different from the ML hardware is configured to execute the set of low-level instructions associated with the second subgraph.

10. A method comprising:
    receiving a machine learning (ML) model;
    generating a graph associated with the ML model, wherein the graph is an internal representation of the ML model;
    partitioning the graph into a first subgraph and a second subgraph, wherein the first subgraph is associated with an ML hardware or an ML hardware emulator, and wherein the second subgraph is associated with a processor different from the ML hardware, wherein the partitioning based on at least one of
        a) whether an operation within a node of the graph is supported by the ML hardware or the ML hardware emulator, or
        b) latency associated with a node within the first subgraph as opposed to the second subgraph, or
        c) an amount of data movement if a node is included within the first subgraph as opposed to the second subgraph;
    generating a set of low-level instructions associated with the first subgraph;
    identifying one or more resources in the ML hardware or the ML hardware emulator to execute the set of low-level instructions associated with the first subgraph; and
    generating a set of low-level instructions associated with the second subgraph for execution by the processor that is different from the ML hardware.

11. The method of claim 10 further comprising executing the set of low-level instructions associated with the first subgraph.

12. The method of claim 10, wherein the node that comprises an operation that is unsupported by the ML hardware or the ML hardware emulator is included in the second subgraph.

13. The method of claim 10, wherein the partitioning is based on at least one of (a), or (b), or (c), or (d) knowledge of architecture of the ML hardware.

14. The method of claim 10, wherein the processor different from the ML hardware is a central processing unit, a graphics pipeline unit, or a field programmable gate array.

15. A system comprising:
a means for receiving a machine learning (ML) model;
a means for generating a graph associated with the ML model, wherein the graph is an internal representation of the ML model;
a means for partitioning the graph into a first subgraph and a second subgraph, wherein the first subgraph is associated with an ML hardware or an ML hardware emulator, and wherein the second subgraph is associated with a processor different from the ML hardware, wherein means for partitioning is based on at least one of:
  a) whether an operation within a node of the graph is supported by the ML hardware or the ML hardware emulator, or
  b) latency associated with a node within the first subgraph as opposed to the second subgraph, or
  c) an amount of data movement if a node is included within the first subgraph as opposed to the second subgraph;
a means for generating a set of low-level instructions associated with the first subgraph;
a means for identifying one or more resources in the ML hardware or the ML hardware emulator to execute the set of low-level instructions associated with the first subgraph; and
a means for generating a set of low-level instructions associated with the second subgraph for execution by the processor that is different from the ML hardware.

16. The system of claim 15 further comprising executing the set of low-level instructions associated with the first subgraph.

17. The system of claim 15, wherein the node that comprises an operation that is unsupported by the ML hardware or the ML hardware emulator is included in the second subgraph.

18. The system of claim 15, wherein the partitioning is based on knowledge of architecture of the ML hardware.

19. A system, comprising:
a processor; and
a compiler executed by the processor, wherein the compiler is configured to
  receive a machine learning (ML) model;
  generate a graph associated with the ML model, wherein the graph is an internal representation of the ML model;
  partition the graph into a first subgraph and a second subgraph, wherein the first subgraph is associated with an ML hardware emulator, and wherein the second subgraph is associated with a processor different from the ML hardware emulator;
  generate a set of low-level instructions associated with the first subgraph; and
  identify one or more resources in the ML hardware emulator to execute the set of low-level instructions associated with the first subgraph.

20. A system, comprising:
a processor; and
a compiler executed by the processor, wherein the compiler is configured to
  receive a machine learning (ML) model;
  generate a graph associated with the ML model, wherein the graph is an internal representation of the ML model;
  partition the graph into a first subgraph and a second subgraph, wherein the first subgraph is associated with an ML hardware and an ML hardware emulator, and wherein the second subgraph is associated with a processor different from the ML hardware and the ML hardware emulator;
  generate a set of low-level instructions associated with the first subgraph; and
  identify one or more resources in the ML hardware and the ML hardware emulator to execute the set of low-level instructions associated with the first subgraph.

* * * * *